United States Patent
Ishii

(10) Patent No.: US 10,924,978 B2
(45) Date of Patent: Feb. 16, 2021

(54) ACCESS CONTROL METHODS AND APPARATUS FOR RADIO SYSTEMS

(71) Applicants: Sharp Kabushiki Kaisha, Sakai (JP); FG INNOVATION COMPANY LIMITED, Tuen Mun (HK)

(72) Inventor: Atsushi Ishii, Vancouver, WA (US)

(73) Assignees: Sharp Kabushiki Kaisha, Sakai (JP); FG Innovation Company Limited, Hong Kong (CN)

(*) Notice: Subject to any disclaimer, the term of this patent is extended or adjusted under 35 U.S.C. 154(b) by 108 days.

(21) Appl. No.: 16/192,962

(22) Filed: Nov. 16, 2018

(65) Prior Publication Data

US 2019/0150061 A1    May 16, 2019

Related U.S. Application Data

(60) Provisional application No. 62/587,329, filed on Nov. 16, 2017.

(51) Int. Cl.
*H04W 48/06* (2009.01)
*H04W 48/02* (2009.01)
(Continued)

(52) U.S. Cl.
CPC ........... *H04W 48/06* (2013.01); *H04L 63/101* (2013.01); *H04L 63/104* (2013.01);
(Continued)

(58) Field of Classification Search
CPC ..... H04W 48/06; H04W 48/18; H04W 48/02; H04W 48/08; H04W 48/12; H04W 48/10;
(Continued)

(56) References Cited

U.S. PATENT DOCUMENTS

| 2007/0270152 A1 | 11/2007 | Nylander et al. |
| 2015/0009887 A1 | 1/2015 | Chen et al. |

(Continued)

FOREIGN PATENT DOCUMENTS

WO    WO 2013/023608 A1    2/2013

OTHER PUBLICATIONS

International Search Report and Written Opinion dated Feb. 8, 2019 in PCT application PCT/US2018/061425.

(Continued)

*Primary Examiner* — Joshua Kading
(74) *Attorney, Agent, or Firm* — Nixon & Vanderhye P.C.

(57) ABSTRACT

A wireless terminal communicates to an access node which is connected to a first core network and a second core network. The wireless terminal comprises receiver circuitry, processor circuitry, and transmitter circuitry. The receiver circuitry is configured to receive from the access node first access control information and to separately receive from the access node second access control information. The processor circuitry is configured to perform, based on the first access control information, an access control procedure for the first core network, and to perform, based on the second access control information, an access control procedure for the second core network. The transmitter circuitry is configured to transmit an access request according to access control information.

10 Claims, 15 Drawing Sheets

(51) Int. Cl.
  *H04W 48/18* (2009.01)
  *H04W 48/08* (2009.01)
  *H04L 29/06* (2006.01)
  *H04W 74/00* (2009.01)
  *H04W 84/04* (2009.01)
  *H04W 48/12* (2009.01)

(52) U.S. Cl.
  CPC ........... *H04L 63/108* (2013.01); *H04W 48/02* (2013.01); *H04W 48/08* (2013.01); *H04W 48/18* (2013.01); *H04W 74/006* (2013.01); *H04W 48/12* (2013.01); *H04W 84/042* (2013.01)

(58) Field of Classification Search
  CPC ............. H04W 74/006; H04W 84/042; H04W 12/08–0808; H04L 63/10; H04L 63/108; H04L 63/101; H04L 63/104; H04L 29/06829; H04L 29/06823
  See application file for complete search history.

(56) References Cited

U.S. PATENT DOCUMENTS

| | | | |
|---|---|---|---|
| 2015/0049609 A1 | 2/2015 | Park | |
| 2017/0311276 A1 | 10/2017 | Tsai et al. | |
| 2018/0176962 A1* | 6/2018 | Wu | H04W 72/14 |
| 2019/0150042 A1* | 5/2019 | Srivastava | H04W 36/08 455/436 |
| 2019/0261261 A1* | 8/2019 | Ishii | H04W 48/18 |
| 2020/0145911 A1* | 5/2020 | Ma | H04W 68/005 |

OTHER PUBLICATIONS

R2-1710170, 3GPP TSG-RAN2#99, TCL, "QoS Flow based Access Control for Connected Mode in NR", Prague, Czech Republic, Oct. 9-13, 2017.
R2-1710261, 3GPP TSG-RAN2 Meeting#99bis, OPPO, "Discussion on access control in NR", Prague, Czech Republic, Oct. 9-13, 2017.
R2-1710289, 3GPP TSG-RAN WG2 #99bis, CATT, "Consideration on access control", Prague, Czech Republic, Oct. 9-13, 2017.
R2-1710423, 3GPP TSG-RAN WG2 Meeting#99bis, ZTE Corporation, Sane chips, "Establishment cause and Cell type for NR access control", Prague, Czech Republic, Oct. 9-13, 2017.
R2-1710424, 3GPP TSG-RAN WG2 Meeting#99bis, ZTE Corporation, Sane chips, "Consideration on the access control in NR", Prague, Czech Republic, Oct. 9-13, 2017.
R2-1710477, 3GPP TSG RAN WG2 #99bis, Ericsson, "Signalling of Access Control Parameters", Prague, Czech Republic, Oct. 9-13, 2017.
R2-1710478, 3GPP TSG RAN WG2 #99bis, Ericsson, "Access Control for NR", Prague, Czech Republic, Oct. 9-13, 2017.
R2-1710479, 3GPP TSG RAN WG2 #99bis, Ericsson, "Access Control for RRC-initiated Access Attempts", Prague, Czech Republic, Oct. 9-13, 2017.
R2-1710480, 3GPP TSG RAN WG2 #99bis, Ericsson, "Establishment causes for NR", Prague, Czech Republic, Oct. 9-13, 2017.
R2-1710481, 3GPP TSG RAN WG2#99bis, Ericsson, "Draft LS on Establishment Causes in NR", Prague, Czech Republic, Oct. 9-13, 2017.
R2-1710482, 3GPP TSG RAN WG2#99bis, Ericsson, "Draft Reply LS on Unified Access Control for 5G NR", Prague, Czech Republic, Oct. 9-13, 2017.
R2-1710602, 3GPP TSG RAN WG2 Meeting #99bis, Intel Corporation, "RAN Implications of 5G Access Control requirements", Prague, Czech Republic, Oct. 9-13, 2017.

R2-1710603, 3GPP TSG RAN WG2 Meeting #99bis, Intel Corporation, "5G access control mechanism in Idle and Inactive", Prague, Czech Republic, Oct. 9-13, 2017.
R2-1710604, 3GPP TSG RAN WG2 Meeting #99bis, Intel Corporation, "5G access control mechanism in Connected", Prague, Czech Republic, Oct. 9-13, 2017.
R2-1710800, 3GPP TSG-RAN2 Meeting #99bis, Qualcomm Incorporated, "Unified Access Control in different RRC Modes", Prague, Czech Republic, Oct. 9-13, 2017.
R2-1710897, 3GPP TSG-RAN WG2 #99bis, KT Corp., "Considerations on Access Control in NR", Prague, Czech Republic, Oct. 9-13, 2017.
R2-1711273, 3GPP TSG-RAN WG2 Meeting #99bis, Nokia, Nokia Shanghai Bell, "Access Barring in NG-RAN", Prague, Czech Republic, Oct. 9-13, 2017.
R2-1711274, 3GPP TSG-RAN WG2 Meeting #99bis, Nokia, Alcatel-Lucent Shanghai Bell, "Access Control applicability to difference RRC states", Prague, Czech Republic, Oct. 9-13, 2017.
R2-1711275, 3GPP TSG-RAN WG2 Meeting #99bis, Nokia, Nokia Shanghai Bell, "Congestion Control for RRC_Connected", Prague, Czech Republic, Oct. 9-13, 2017.
R2-1711385, 3GPP TSG-RAN WG2 #99bis, LG Electronics Inc., "Access category based access barring for RRC_Idle and RRC_Inactive", Prague, Czech Republic, Oct. 9-13, 2017.
R2-1711394, 3GPP TSG-RAN WG2 #99bis, LG Electronics Inc., "Random Access Backoff and Access Barring", Prague, Czech Republic, Oct. 9-13, 2017.
R2-1711398, 3GPP TSG-RAN WG2 #99bis, LG Electronics Inc., "Access category based access barring mechanism for RRC_Connected", Prague, Czech Republic, Oct. 9-13, 2017.
R2-1711487, 3GPP TSG-RAN WG2 #99bis, Huawei, HiSilicon, "Basic Access Control in NR", Prague, Czech Republic, Oct. 9-13, 2017.
R2-1711498, 3GPP TSG-RAN WG2 #99bis, Huawei, HiSilicon, "Access Control in NR for RRC_Connected", Prague, Czech Republic, Oct. 9-13, 2017.
R2-1711499, 3GPP TSG-RAN WG2 #99bis, Huawei, HiSilicon, "Access Control in RRC_Inactive", Prague, Czech Republic, Oct. 9-13, 2017.
R2-1711500, 3GPP TSG-RAN WG2 #99bis, Huawei, HiSilicon, "Access Control for MT", Prague, Czech Republic, Oct. 9-13, 2017.
R2-1711624, 3GPP TSG-RAN WG2 Meeting #99bis, Samsung, "Way-forward for NR access control", Prague, Czech Republic, Oct. 9-13, 2017.
R2-1711625, 3GPP TSG-RAN WG2 Meeting #99bis, Samsung, "NR access control procedure", Prague, Czech Republic, Oct. 9-13, 2017.
R2-1711626, 3GPP TSG-RAN WG2 Meeting #99bis, Samsung, "On linking Establishment Cause and standardized access category", Prague, Czech Republic, Oct. 9-13, 2017.
R2-1711627, 3GPP TSG-RAN WG2 Meeting #99bis, Samsung, "Barring configuration in NR access control", Prague, Czech Republic, Oct. 9-13, 2017.
R2-1711628, 3GPP TSG-RAN WG2 Meeting #99bis, Samsung, "Barring skip indicator in NR", Prague, Czech Republic, Oct. 9-13, 2017.
R2-1711635, 3GPP TSG-RAN WG2 Meeting #99bis, MediaTek Inc., "Unified Access Control", Prague, Czech Republic, Oct. 9-13, 2017.
3GPP TS 36.331 V14.1.0, Technical Specification, $3^{rd}$ Generation Partnership Project; Technical Specification Group Radio Access Network; Evolved Universal Terrestrial Radio Access (E-UTRA); Radio Resource Control (RRC); Protocol specification (Release 14).
International Preliminary Report on Patentability dated May 19, 2020 in PCT application PCT/US2018/061425.

* cited by examiner

ACCESS CONTROL METHODS AND APPARATUS FOR RADIO SYSTEMS

The application claims the priority and benefit of U.S. Provisional Patent Application 62/587,329, filed Nov. 16, 2017, entitled "ACCESS CONTROL METHODS AND APPARATUS FOR RADIO SYSTEMS", which is incorporated herein by reference in its entirety.

TECHNICAL FIELD

The technology relates to wireless communications, and particularly to methods and apparatus for controlling access to radio systems.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on the radio channels certain information which is required for mobile stations to access to the network. In Long-Term Evolution (LTE) and LTE Advanced (LTE-A), such information is called "system information" ("SI"). Each access node, such as an evolved NodeB ("eNB") or a gNB (for, e.g., New Radio [NR] technology), broadcasts such system information to its coverage area via several System Information Blocks (SIBs) on downlink radio resources allocated to the access node.

Typical radio communication systems employ the capability to restrict/control accesses from users when the network is congested, known as Access Control (AC). In Long-Term Evolution (LTE) and LTE Advanced (LTE-A) (a.k.a. 4G network), every user equipment (UE) maintains at least one Access Class, a classifier programmed and saved in the Universal Integrated Circuit Card (UICC) inserted in the UE. During a congestion, the network may broadcast access barring information for each of the Access Classes on which the access restrictions are necessary.

In one method of AC, the access barring information may configure UEs to restrict all types of access attempts per Access Class. This configuration is referred as Access Class Barring (ACB). Other access restriction configurations introduced in LTE/LTE-A include Service Specific Access Control (SSAC) (restricting certain types of access, such as voice calls), ACB for Circuit Switched Fallback (CSFB) (restricting falling back to 3G voice services), Smart Congestion Mitigation (SCM) (restricting data communications initiated background during a voice call), Extended Access Barring (EAB) (AC for Machine-Type Communications) and Access Control for general Data Connectivity (ACDC) (restrict access from specific user applications). The access barring information for these configurations may be broadcasted by eNBs (base stations) in System Information Block Type 2 (SIB2) or System Information Block Type 14 (SIB14).

3GPP is currently discussing introduction of a unified approach for the Access Control scheme to be adopted for 5G network. This unified approach may be applicable to not only gNBs (5G base stations) but also eNBs that connect to 5G core networks What is needed, therefore, and an example object of the technology disclosed herein, are methods, apparatus, and techniques for a wireless terminal to make access control decisions in dependence upon type(s) of core networks for which the wireless terminal is configured.

SUMMARY

In one of its example aspects the technology disclosed herein concerns a wireless terminal that communications with an access node of a radio access network. The wireless terminal comprises receiver circuitry, processor circuitry, and transmitter circuitry. The receiver circuitry is configured to receive from an access node first access control information and to separately receive from the access node second access control information. The processor circuitry is configured to perform, based on the first access control information, an access control procedure for a first core network, and initiate an access request for the first core network in case that an access attempt is allowed by the access control procedure for the first core network. The processor circuitry is also configured to perform, based on the second access control information, an access control procedure for a second core network in case that the access attempt is barred by the access control procedure for the first core network, and initiate an access request for the second core network in case that the access attempt is allowed by the access control procedure for the second core network. The transmitter circuitry is configured to transmit the access request for the allowed core network.

Another example aspect of the technology disclosed herein concerns a method in a wireless terminal. The method comprises receiving from an access node first access control information and separately receiving from the access node second access control information; performing, based on the first information, an access control procedure for a first core network, and initiate an access request for the first core network in case that an access attempt is allowed by the access control procedure for the first core network; performing, based on the second information, an access control procedure for a second core network in case that the access attempt is barred by the access control procedure for the first core network, and initiate an access request for the second core network in case that the access attempt is allowed by the access control procedure for the second core network; and transmitting the access request for the allowed core network.

In another of its aspects the technology disclosed herein concerns an access node of a radio access network. The access node comprises processor circuitry and transmitter circuitry. The processor circuitry is configured to generate a first access control information for a first core network and separately to generate a second access control information for a second core network. The first access control information comprises access control parameters configured to be used for evaluation by a wireless terminal in determining whether an access attempt is allowed or barred for the first core network. The second access control information comprises access control parameters configured to be used for evaluation by a wireless terminal in determining whether the access attempt is allowed or barred for the second core network. The transmitter circuitry is configured to transmit the first access control information and the second access control information over a radio interface to the wireless terminal. Another aspect of the technology disclosed herein concerns a method of operating such an access node.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 1-1 through FIG. 1-4 are diagrammatic views showing architectural configurations of differing radio communications systems according to different respective example embodiments and modes.

FIG. 2 is a schematic view of a generic example embodiment and mode of both an access node and a wireless terminal comprising a radio communications system for which access control is implemented; FIG. 2-1 through FIG. 2-4 are schematic views of access nodes and wireless terminals according to the different example embodiments and modes of FIG. 1-1 through FIG. 1-4, respectively.

FIG. 3 is a diagrammatic view of a generic access control program executed by an access controller of a wireless terminal in conjunction with access control information; FIG. 3-1 through FIG. 3-4 are diagrammatic views of access control programs according to the different example embodiments and modes of FIG. 1-1 through FIG. 1-4, respectively.

FIG. 4 is a diagrammatic view of a generic access control procedure performed upon execution of the generic access control program of FIG. 3; FIG. 4-1 through FIG. 4-4 are diagrammatic views of access control procedures performed upon execution of the access control programs of FIG. 3-1 through FIG. 3-4, respectively.

DETAILED DESCRIPTION

Figure 1:
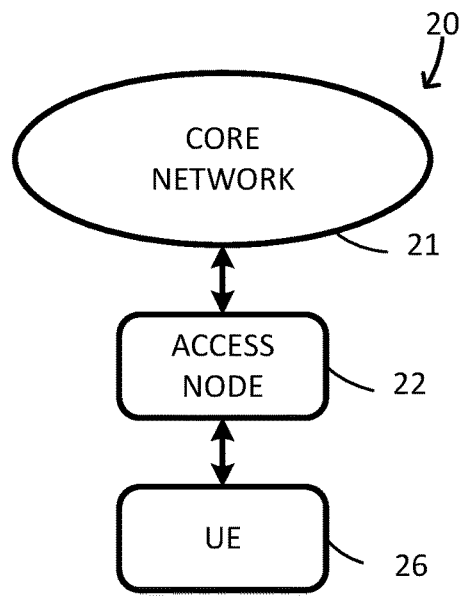
FIG. 1 is a diagrammatic view showing a generic architectural configuration of a radio communications system in which access control is implemented.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a gNB (for, e.g., New Radio [NR] technology), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12 and higher), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As illustrated by the high level generic view of FIG. 1, a typical radio communication system comprises a core network 20; a radio access network including one or more base stations or access nodes 22, and terminal devices 26 used by the end users. The Core Network (CN) 21 includes the central part of the radio communication system that provides various services to customers who are connected by the Radio Access Network. Example functions of a core network are discussed above. The core network in the 4G network is called Evolved Packet Core (EPC), whereas the core network in the 5G network is referred as 5G Core Network (5GCN). The Radio Access Network (RAN) comprises, e.g., is a part of, a radio communication system that resides between terminal devices and the core network. The RAN provides connectivity to the devices through radio interfaces via the base station(s) or access node(s) 22, e.g., via eNB (in LTE/LTE-A RAN) or via gNB (in 5G RAN). The terminal devices 26 which are used by end users are also referred to as wireless terminals or User Equipment (UE).

While FIG. 1 shows a generic radio communications system 20, FIG. 1-1 through FIG. 1-4 show architectural configurations of differing example embodiments and modes of respective radio communications systems 20-1 through 20-4. Each radio communications system 20 comprises one or more core networks 21, a base station or access node 22, and one or more wireless terminals or UEs 26. For example, radio communications system 20-1 comprises core network 21-1, access node 22-1, and wireless terminal 26-1; radio communications system 20-2 comprises core network 21-2, access node 22-2, and wireless terminal 26-2; and so forth. The example radio communications system 20-4 of FIG. 1-4 comprises two core networks, e.g., core network 21-4-EPC and core network 21-4-5GCN and two different types of wireless terminals, e.g., wireless terminal 26-4LTE and wireless terminal 26-4-eLTE.

Figure 1:
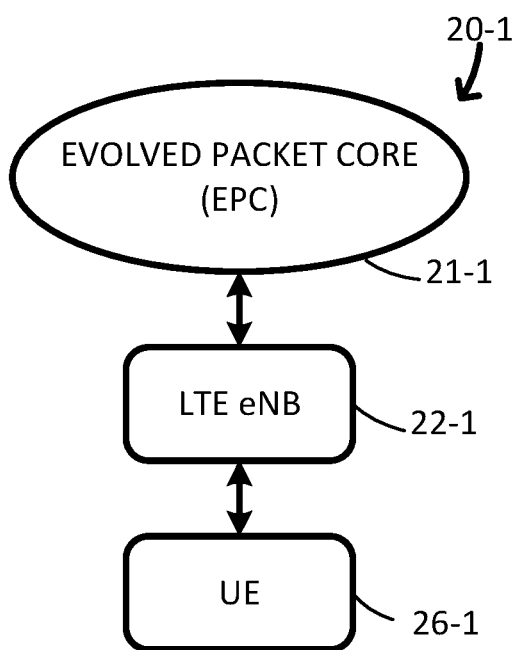
Figures 1, 2:
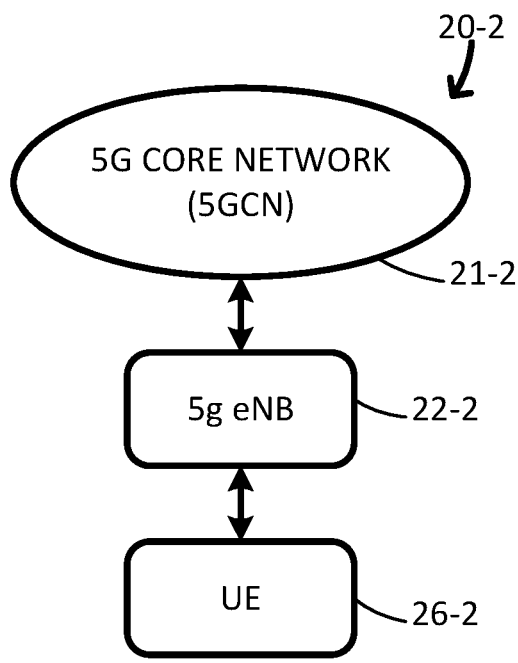
Figures 1, 2, 3:
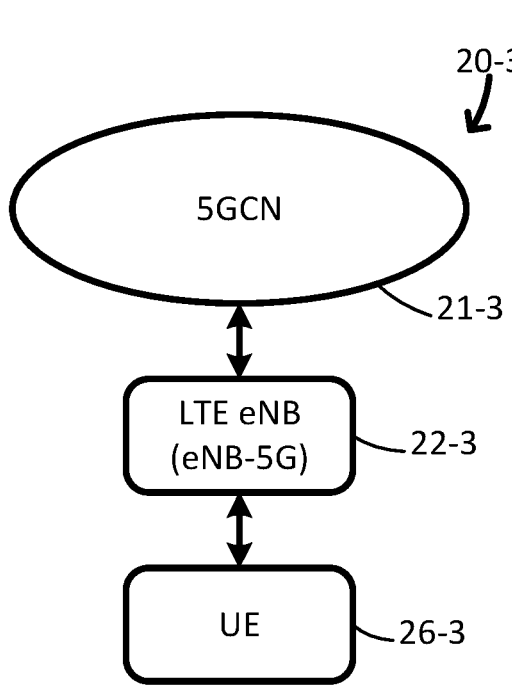
Figures 1, 2, 3, 4:
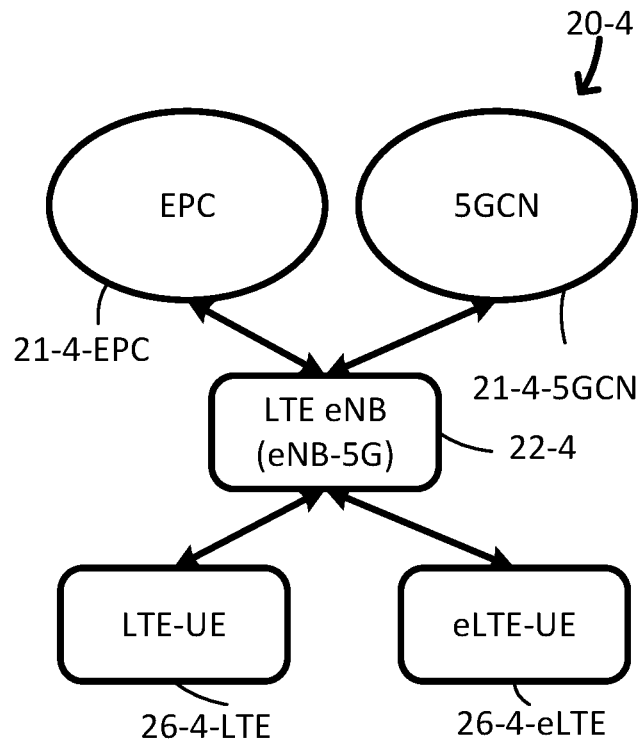
Figure 2:
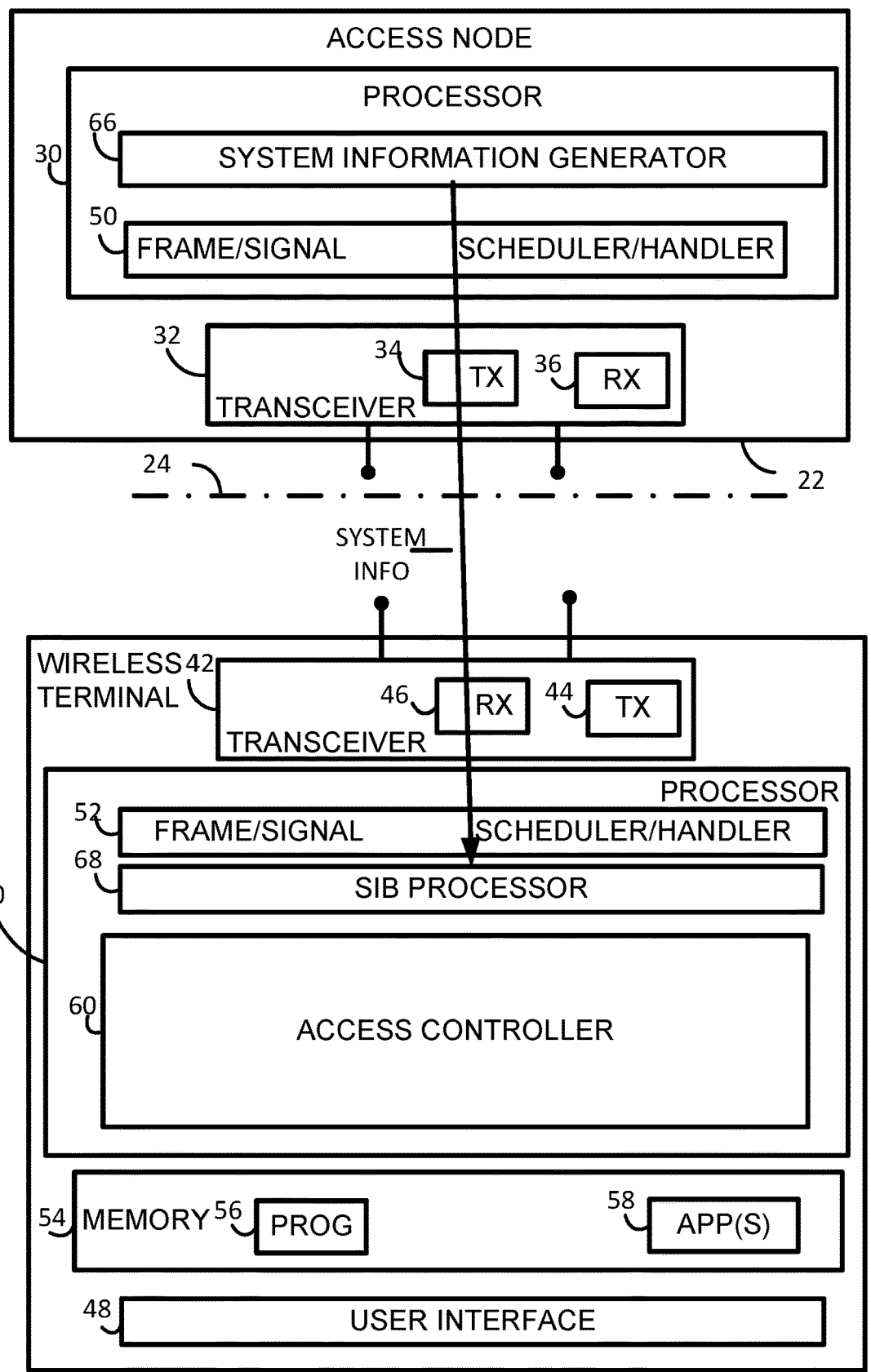
Figures 1, 2:
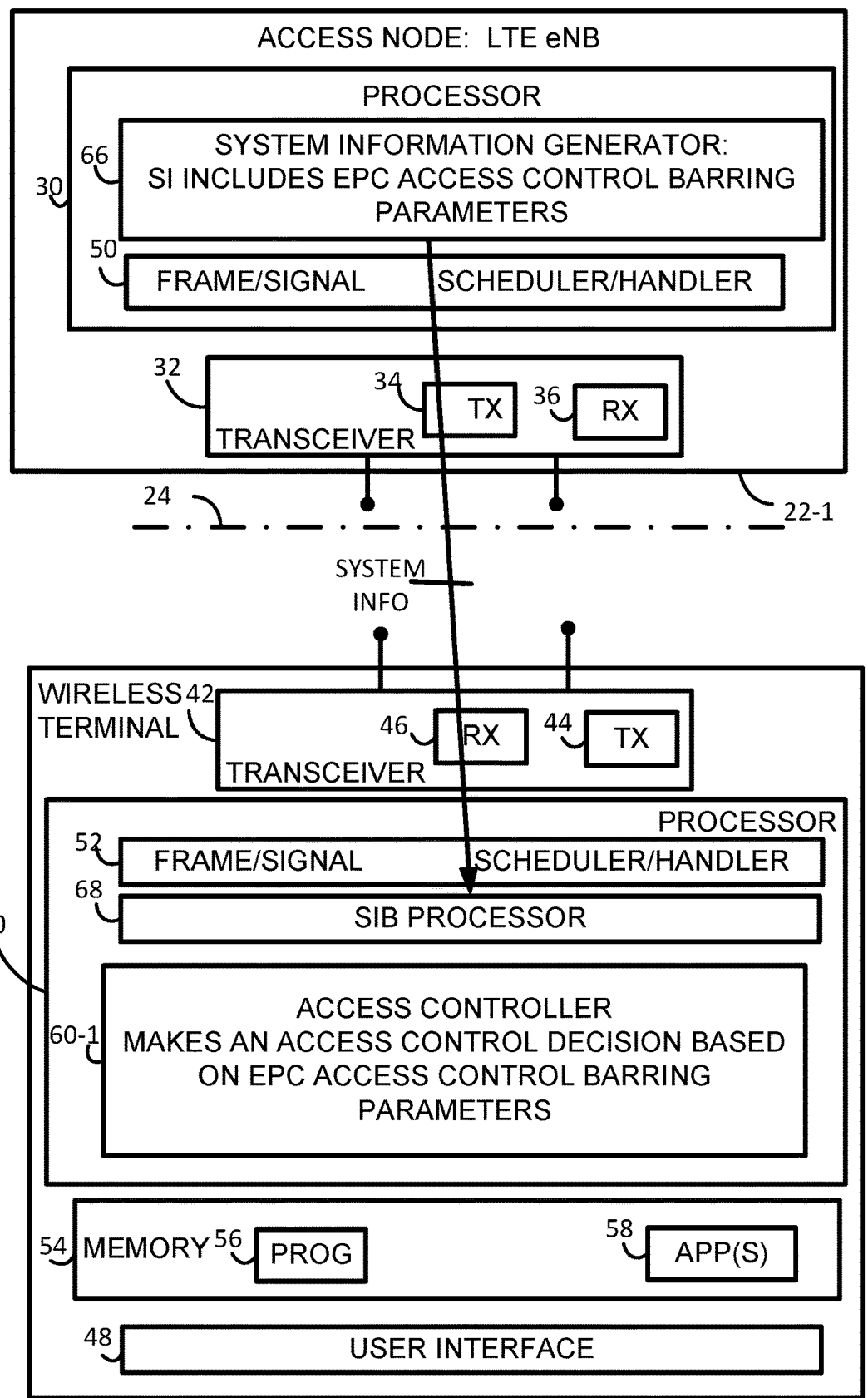
Figure 2:
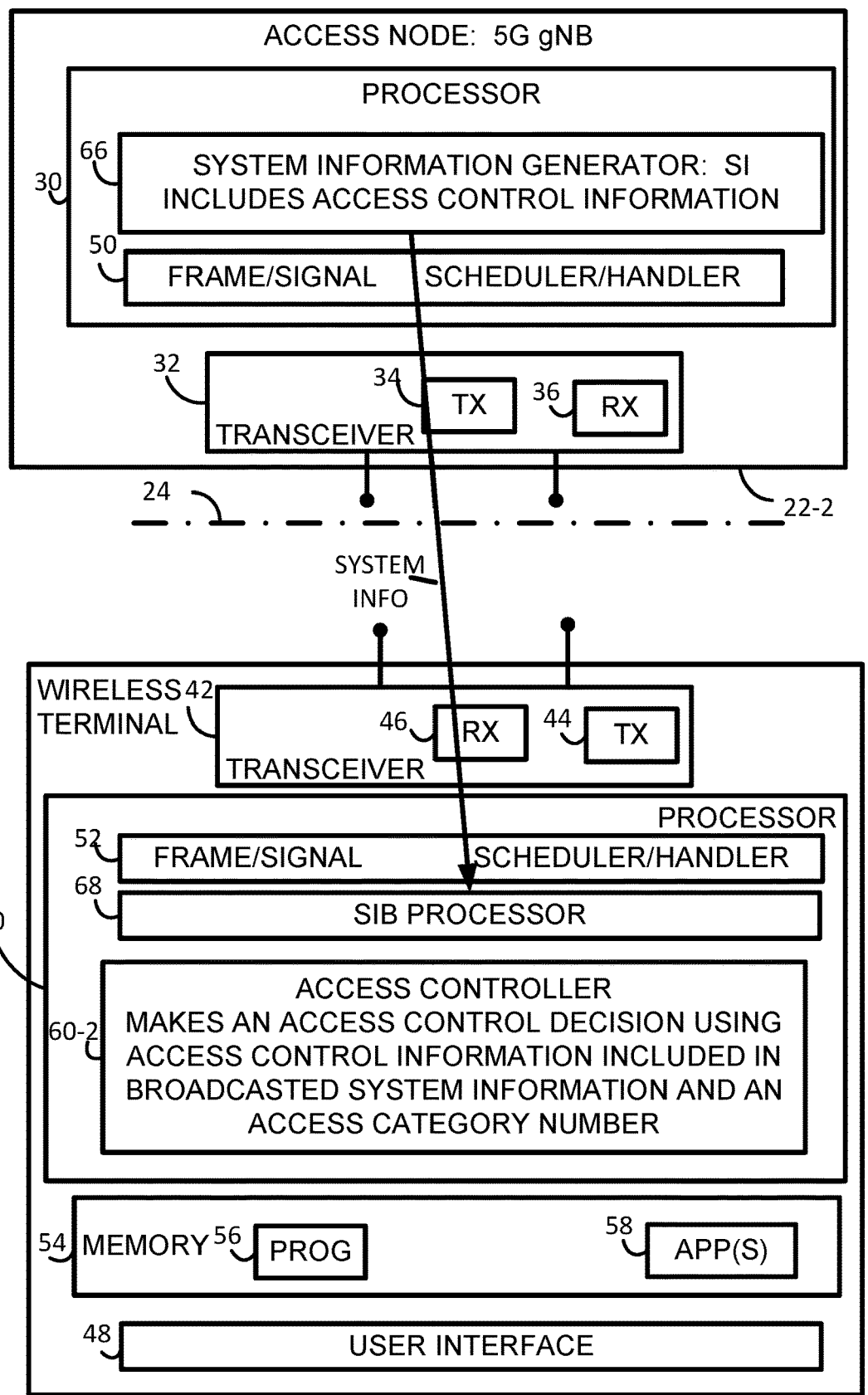
Figures 2, 3:
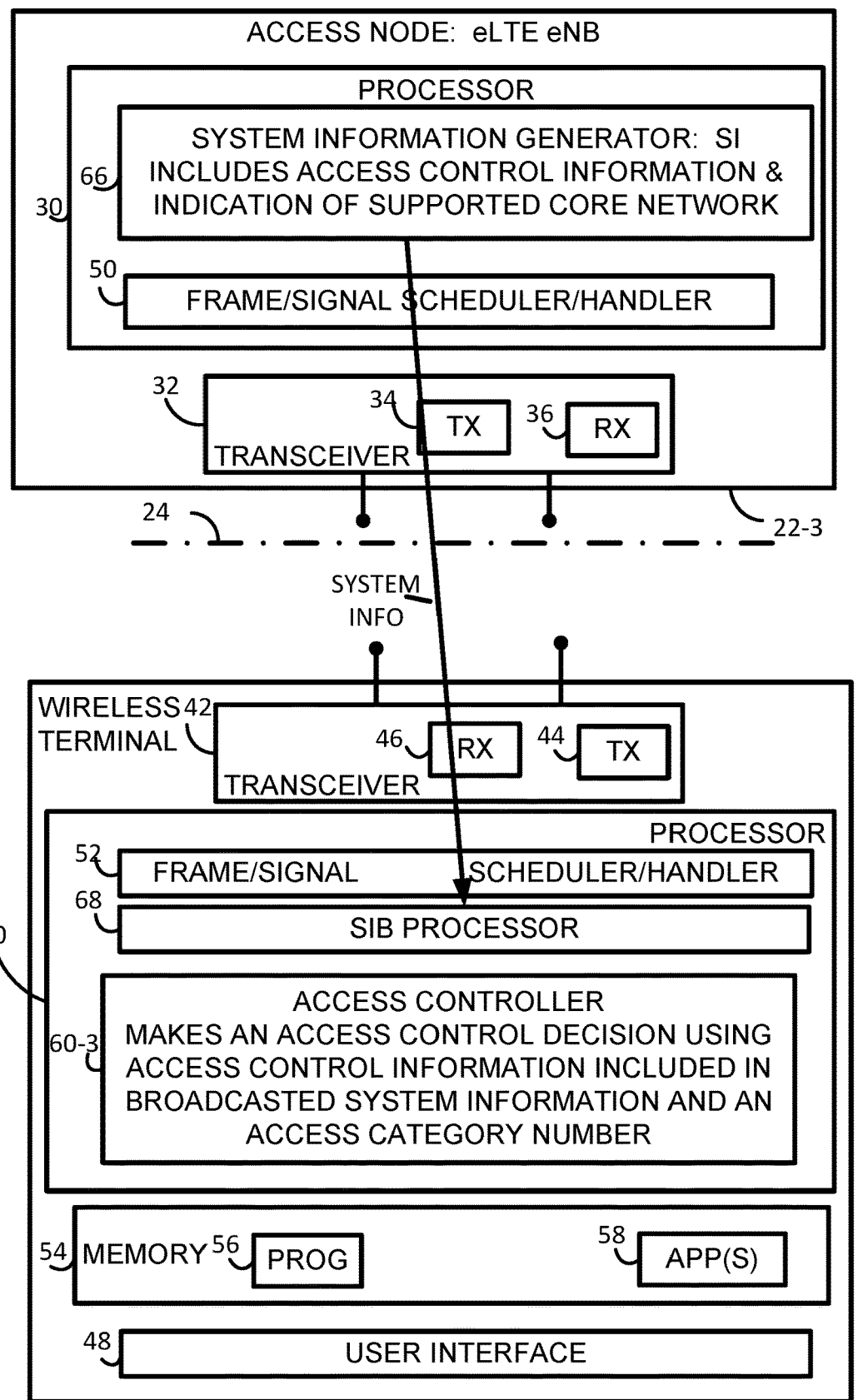
Figures 2, 3, 4:
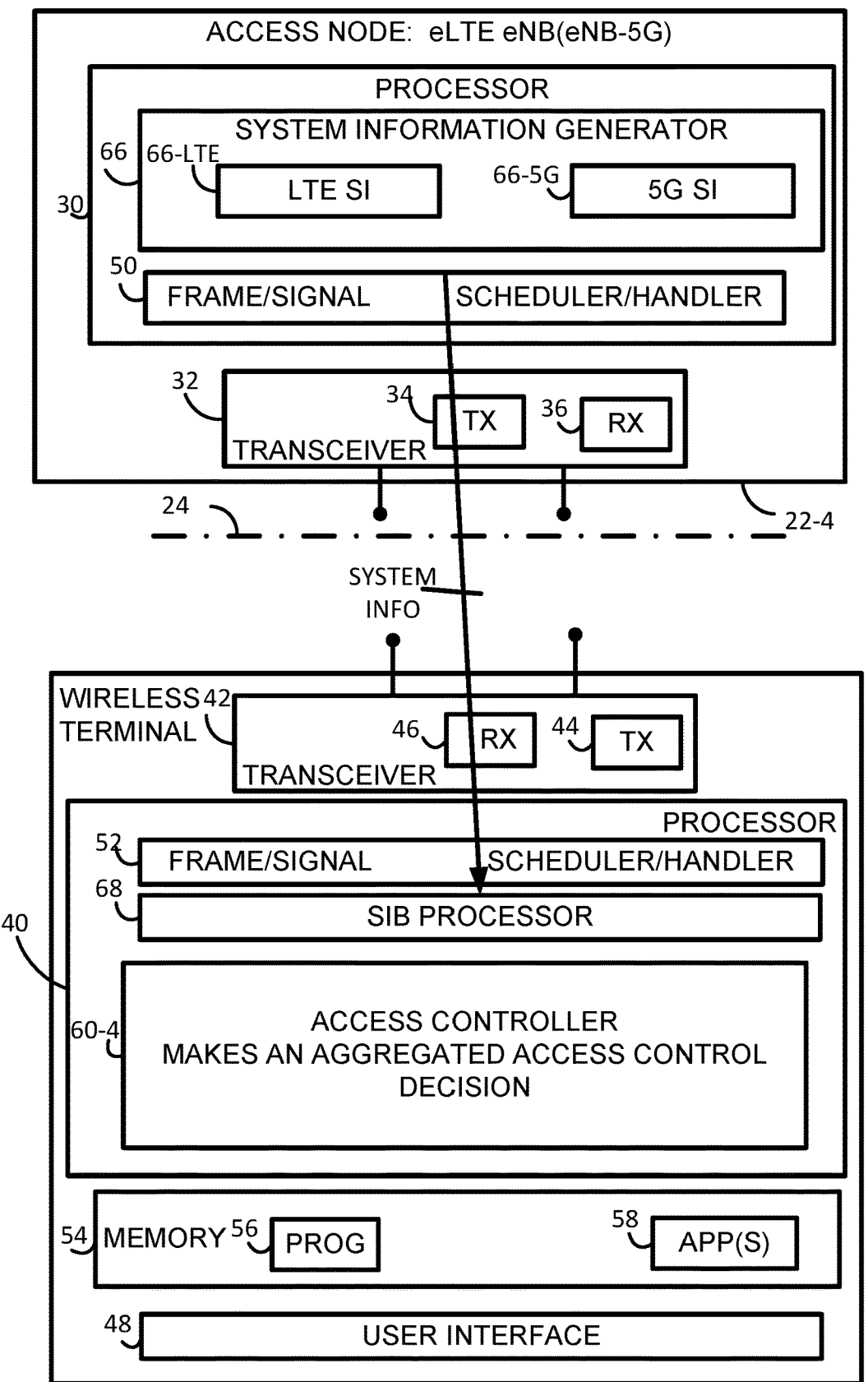
Figures 1, 3:
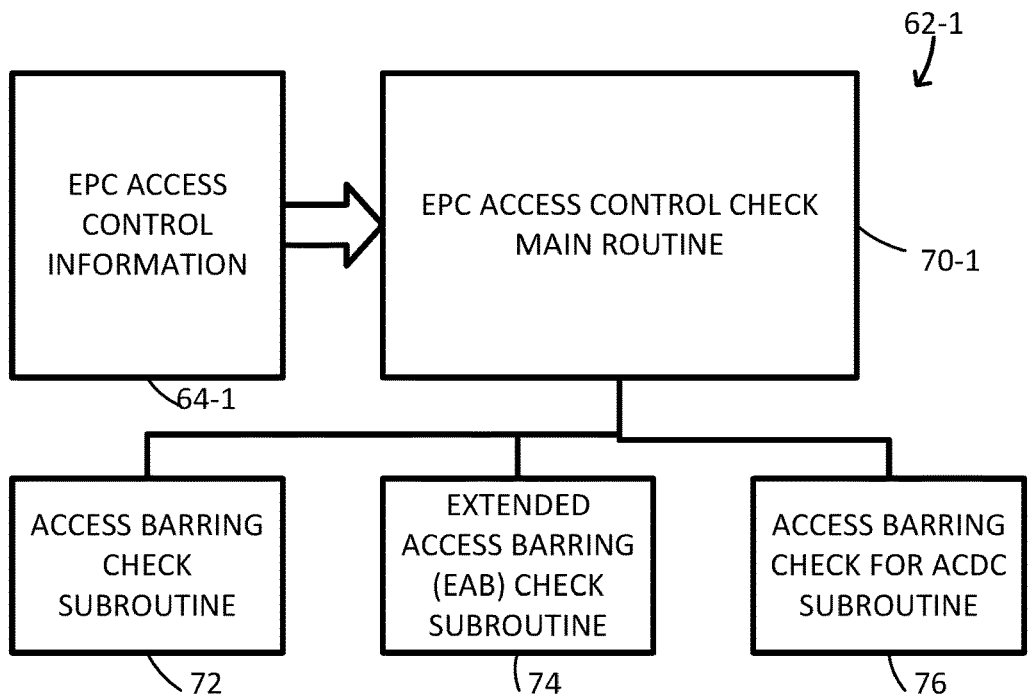
Figures 1, 4:
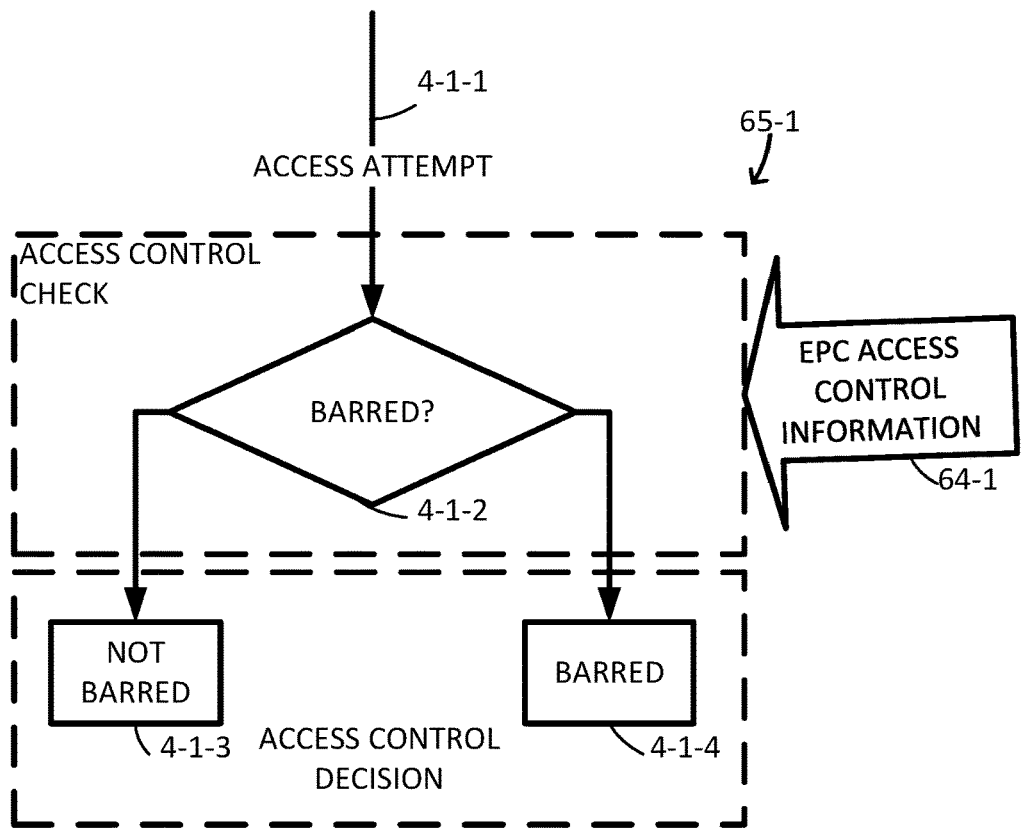
Figures 2, 3:
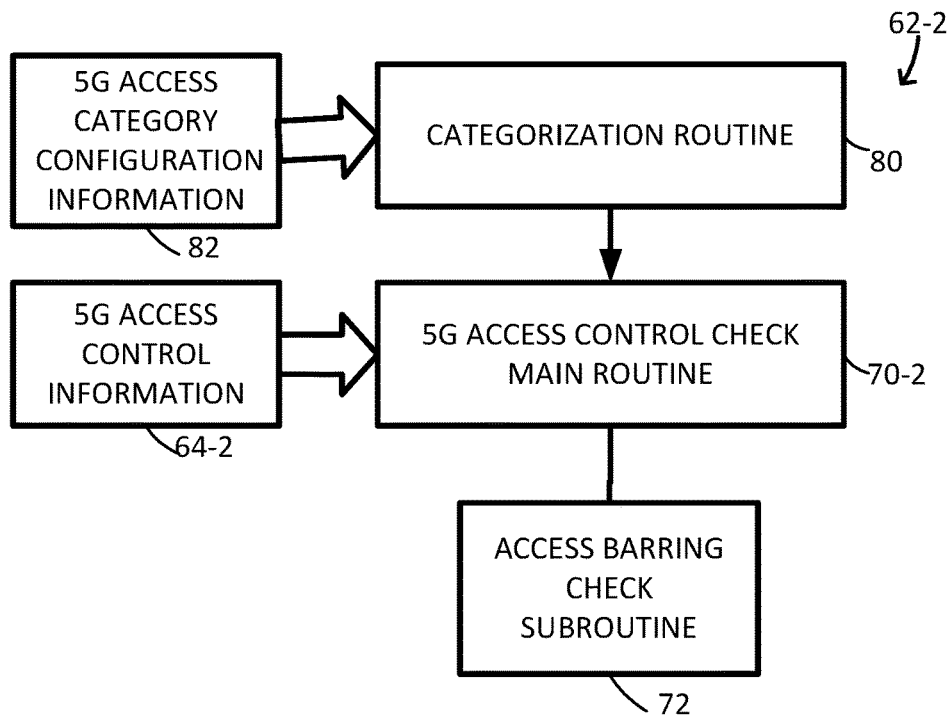
Figures 2, 4:
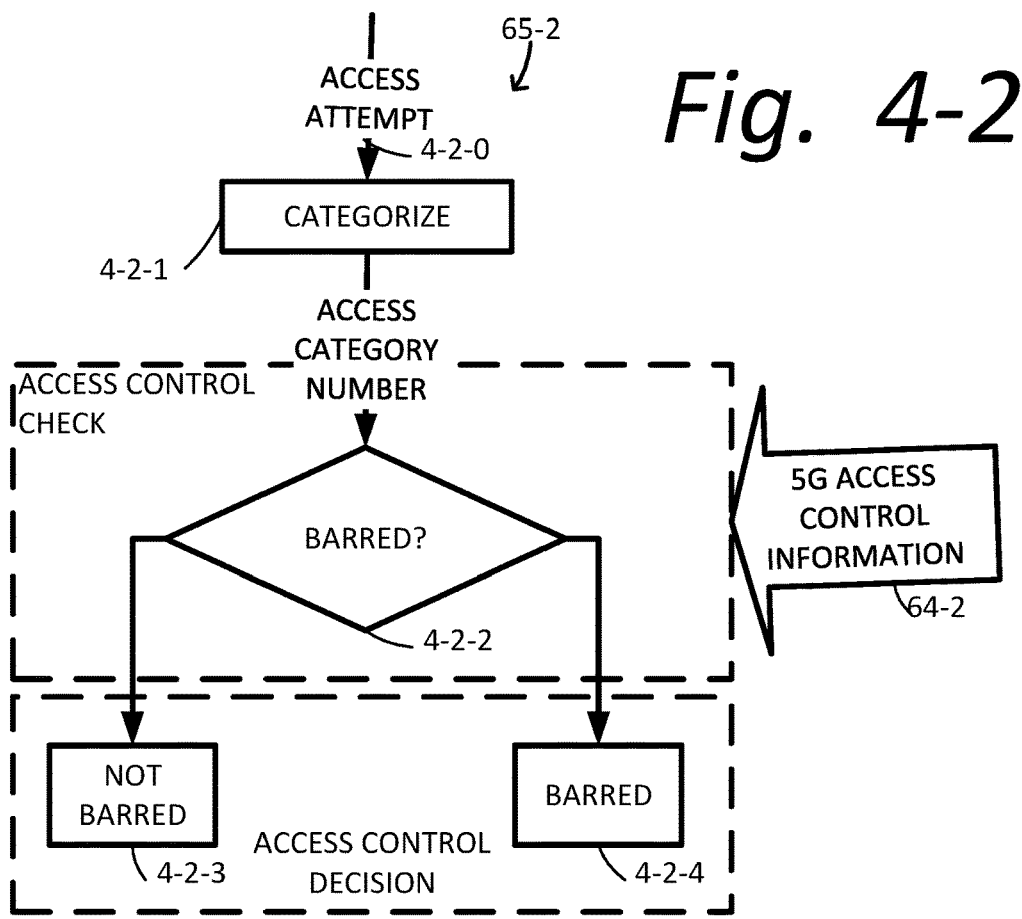
Figure 3:
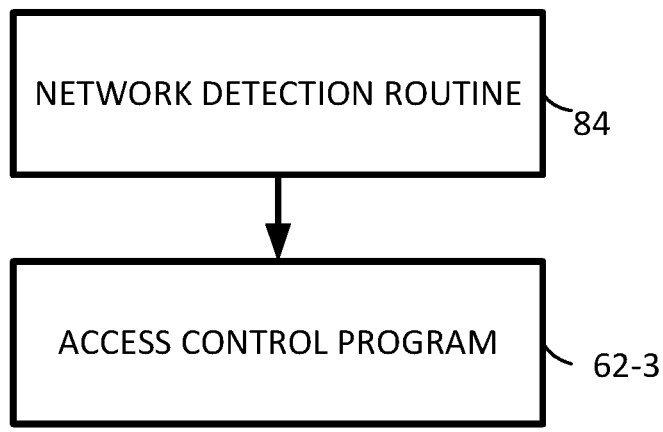
Figures 3, 4:
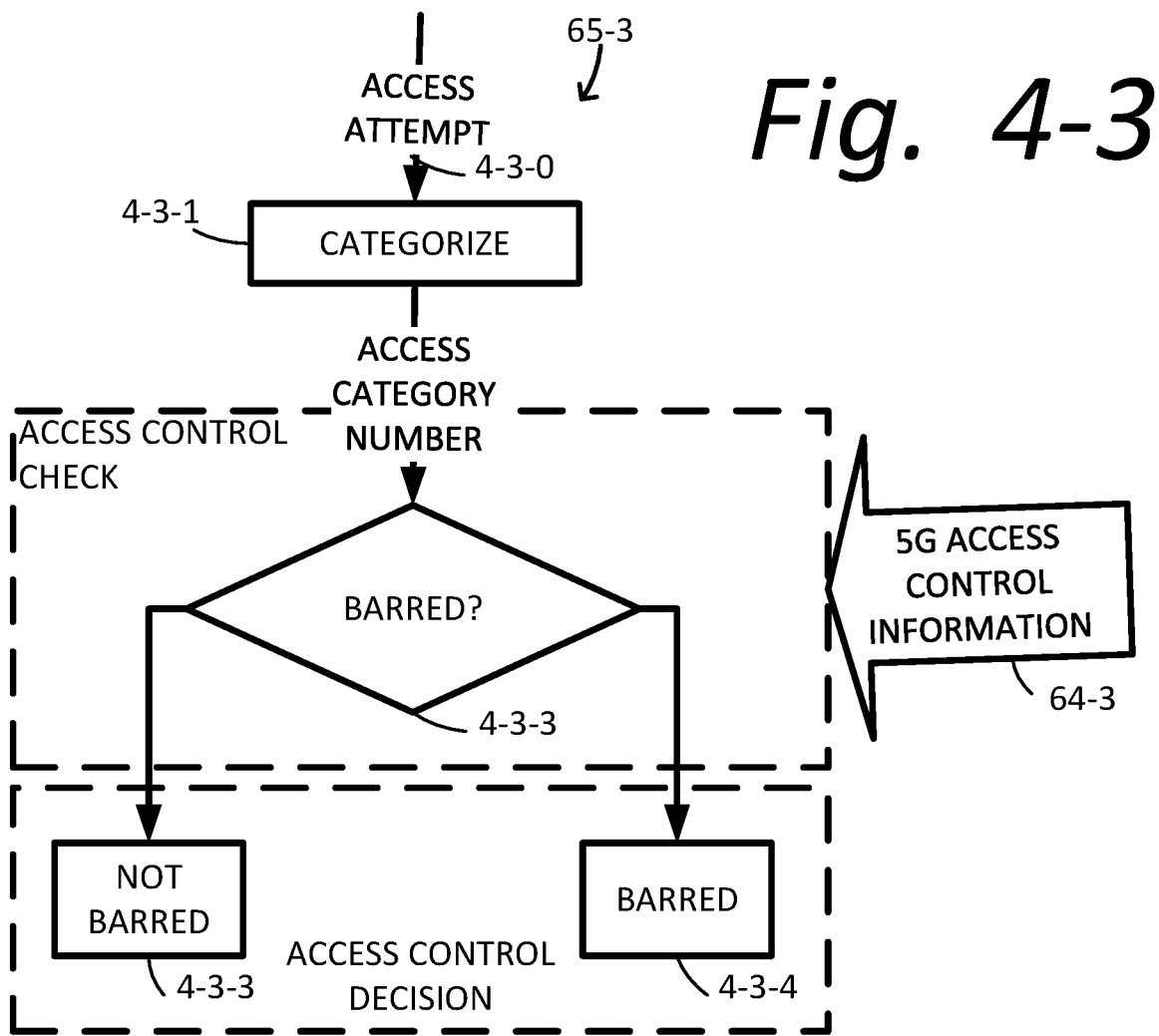
Figures 3, 4:
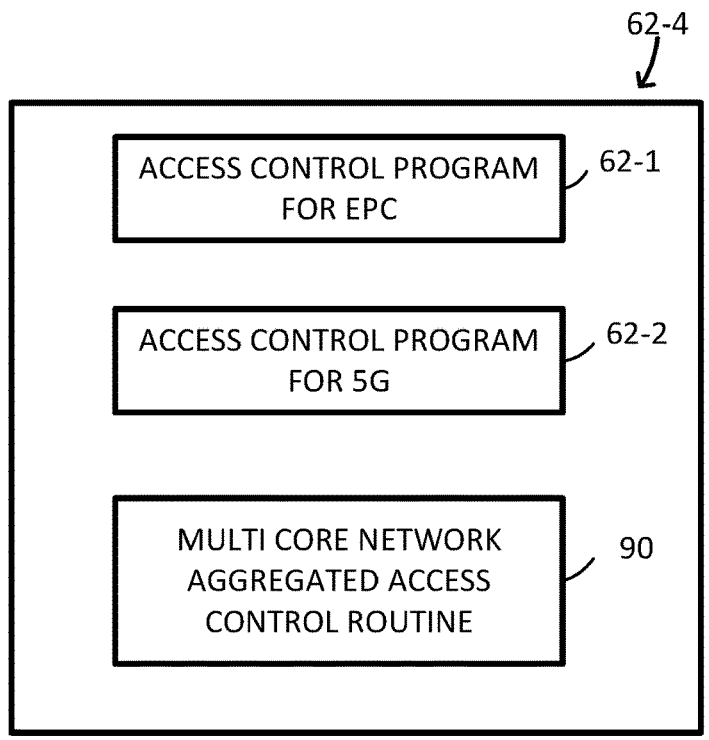
Figure 4:
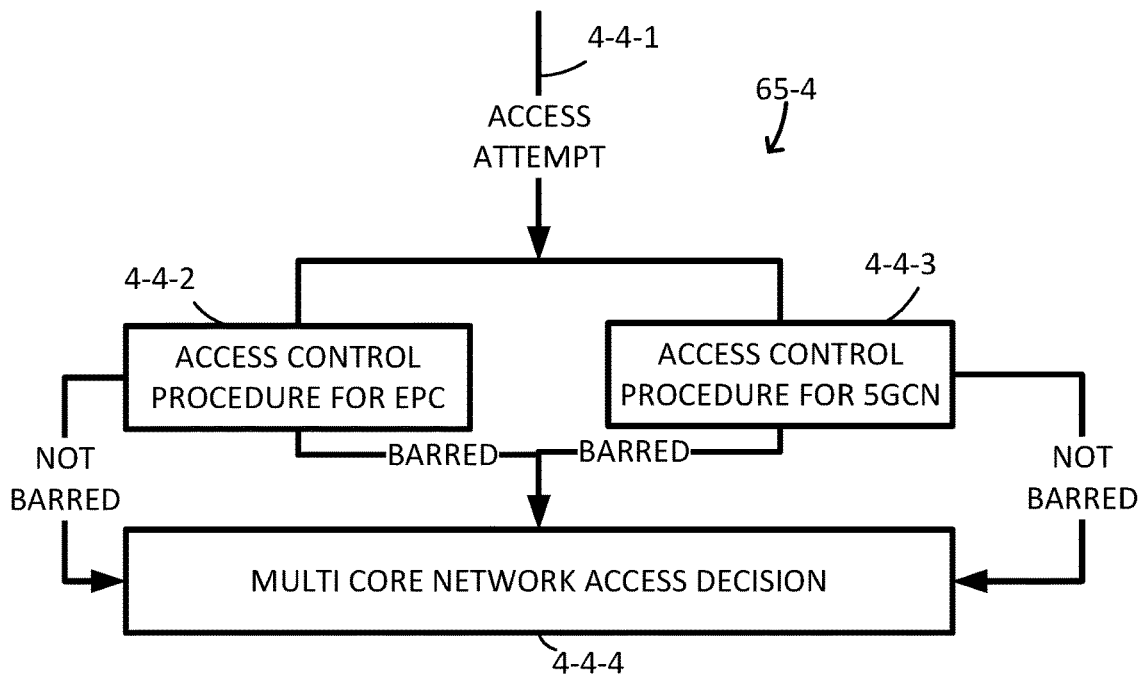

One objective of various example embodiments and modes of the technology disclosed herein is to control access by the one or more wireless terminals 26 to the respective radio communications system 20, particularly but not exclusively in a situation of network congestion. FIG. 2 shows a generic example embodiment and mode of both an access node 22 and a wireless terminal 26 for which such access control is implemented. FIG. 2 shows, for example, that radio access node 22 communicates over air or radio interface 24 (e.g., Uu interface) with wireless terminal 26. As mentioned above, and depending upon which type of radio communications system 20 is employed, the radio access node 22 may be any suitable node for communicating with the wireless terminal 26, such as a base station node, an eNodeB ("eNB"), or a gNB (for, e.g., New Radio [NR] technology), for example. The node 22 comprises node processor circuitry ("node processor 30") and node transceiver circuitry 32. The node transceiver circuitry 32 typically comprises node transmitter circuitry 34 and node receiver circuitry 36, which are also called node transmitter 34 and node receiver 36, respectively.

The wireless terminal 26 comprises terminal processor circuitry 40 ("terminal processor 40") and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically but is not required to comprise user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s). The respective transmitter circuits 34 and 44 may comprise, e.g., amplifier(s), modulation circuitry and other conventional transmission equipment. The respective receiver circuits 36 and 46 may comprise, e.g., e.g., amplifiers, demodulation circuitry, and other conventional receiver equipment.

In general operation node, 22 and wireless terminal 26 communicate with each other across radio interface 24 using predefined configurations of information. By way of non-limiting example, the radio access node 22 and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between radio access node 22 and wireless terminal 26 over radio interface 24, the node processor 30 and terminal processor 40 of FIG. 2 are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52. It should be understood that, in differing technologies, the configurations of information may not necessarily be denominated as "frames" or have the LTE frame structure, but for such other differing technology the configurations of information may be otherwise structure and referenced.

The wireless terminal 26 also comprises a storage device or memory 54. As explained herein with reference to FIG. 8, for example, the memory 54 may take the form of read only memory (ROM), random access memory (RAM), cache memory, or semiconductor memory, just to name a few examples. One or more executable computer programs may be stored in program memory 56. One or more applications executed by the terminal processor 40 of wireless terminal 26 in conjunction with services rendered by or using wireless terminal 26 may be stored in applications memory 58.

Figure 3:
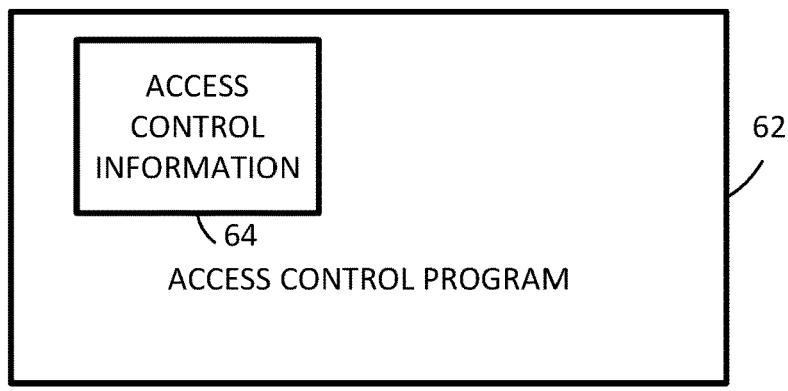

In the various example embodiments and modes described herein, the wireless terminal 26 comprises a terminal access controller 60, also known as access controller 60. As described herein, the access controller 60 executes an access control program 62 generically depicted by FIG. 3. FIG. 3 further shows that the access control program 62 generically employs access control information 64 obtained from the core network 21 in making access control checks. The execution of the access control program 62 results in performance of an access control procedure 65 which is generically shown in FIG. 4.

Figure 4:

The access controller 60 may comprise or be realized by, for example, terminal processor 40. Thus, the wireless terminal 26 comprises a least one processor (e.g., terminal processor 40) and at least one memory 54 (e.g., program memory 56) including computer program code stored on non-transient memory. The memory 54 and the computer program code, e.g., of the access control program 62, are configured to, working with the at least one processor, to perform access control operations of the generic access control procedure 65. Whereas FIG. 3 shows a generic access control program 62, FIG. 3-1 through FIG. 3-4 show respective other example access control programs 62-1 through 62-4 which may also be stored in memory and which, working with at least one processor, perform the access control operations of the respective access control procedures 65-1 through 65-4 shown in FIG. 4-1 through FIG. 4-4, respectively.

As mentioned above, the access control program 62 is performed in conjunction with access control information 64. The access control information 64, in at least some example embodiments and modes, is received from the radio communications system. In example embodiments and modes, the access control information 64 may be transmitted to the wireless terminal 26 in broadcast system information. The broadcast system information may be formatted in system information, such as (for example) in one or more system information blocks (SIBs). Thus, FIG. 2 also shows the access node 22 as comprising system information generator 66. The access control information 64, which may be included in the system information generated by system information generator 66, is transmitted by node transmitter 34 over radio interface premise 24 to the terminal receiver 46 of wireless terminal 26, where it is handled by system information processor 68 of wireless terminal 26.

Embodiment 1

A first example embodiment and mode is illustrated with reference to the radio communications system 20-1 of FIG. 1-1, the access node 22-1 and wireless terminal 26-1 of FIG. 2-1, the access control program 64-1 of FIG. 3-1; and the access control procedure 65-1 of FIG. 4-1. FIG. 1-1 particularly shows a network architecture for the 4G network, where the core network 21-1 is EPC, providing LTE/LTE-A services. In this case, the eNB 22-1 is capable of connecting only to EPC (not to 5GCN). The UE 26-1 shown in FIG. 1-1 is capable of receiving services provided by the 4G network and may also support 5G features. However, when connected to this eNB 22-1, the UE 26-1 may not activate such 5G features.

The access controller 60-1 of FIG. 2-1 is shown as making an access control decision based on EPC access control information comprising access control barring parameters. The EPC access control barring parameters may be obtained from broadcast system information obtained from the core network 21-1.

FIG. 3-1 shows that the access control program 62-1 executed by access controller 60 of FIG. 2-1 comprises an EPC access control check main routine 70-1; access barring check subroutine 72; extended access barring (EAB) check subroutine 74; and access barring check for ACDC subroutine 76. The EPC access control check main routine 70-1 utilizes EPC access control information 64-1 which, as shown in FIG. 3-1, comprises access control barring parameters.

The access control procedure 65-1 performed upon execution of the EPC access control check main routine 70-1 is shown in FIG. 4-1. As act 4-1-1, an indication of an access attempt is received by the EPC access control check main routine 70-1. As used herein, an indication of an access attempt may be received when an access attempt is generated for any reason, such as (for example) by an application (stored in applications memory 58), e.g., upon requesting a service or connection for performance of the application, or for other reason associated with operation of the wireless terminal 26 (such as, for example, a tracking area update). Upon receiving an access attempt, as act 4-1-2 the EPC access control check main routine 70-1 determines whether the access attempt is barred. If the decision of act 4-1-2 is that the access request is not barred, then as act 4-1-3 the access is permitted. Otherwise, if the decision of act 4-1-2 is that the access request is barred, then as act 4-1-4 the access is not permitted.

A specific implementation of the access control program 62-1 of FIG. 3 and the access control procedure 65-1 of FIG. 4-1 is illustrated with reference to Listing 1 and Listing 2 provided below. Listing 1 shows the EPC access control information 64-1 for the first example embodiment and mode, Listing 2 describes in more detail example acts of the access control procedure 65-1 resulting from execution of access control program 62-1.

In Listing 1, the information element ac-BarringInfo comprises the information for Access Class Barring (ACB). The two information elements, ssac-BarringForMMTEL-Voice-r9 and ssac-BarringForMMTEL-Video-r9 comprise SSAC for restricting voice calls and video calls, respectively. ac-BarringForCSFB-r10 includes information for ACB for CSFB. ac-BarringSkipForMMTELVoice-r12, ac-BarringSkipForMMTELVideo-r12, ac-BarringSkipForSMS-r12 and ac-BarringPerPLMN-List-r12 information elements conveys barring parameters for SCM. acdc-BarringForCommon-r13 and acdc-BarringPerPLMN-List-r13 are the information elements for ACAD. Finally, SIB14 is dedicated for Extended Access Barring (EAB).

As indicated above, FIG. 4-1 shows a high level view of the UE access control procedure for the UE that has received SIB2/SIB14 for the first example embodiment and mode. The access control procedure 65-1 may be invoked when an event of an access attempt occurs in the UE. An access attempt is an action triggered by the UE to access the network for initiating services. Examples of such actions include (but not limited to) Radio Resource Control (RRC) connection establishment for a voice/video/data/emergency call, mobile-originated signaling messages and short message services (SMS). When such an access attempt occurs, the UE may perform Access Check shown in FIG. 2, which may derive an access decision indicating whether this access attempt is allowed (not barred) or not (barred).

In Listing 2, the acts of section 5.3.3.11 may comprise the access barring check subroutine 72; the acts of section 5.3.3.12 may comprise the extended access barring (EAB) check subroutine 74; and the acts of section 5.3.3.14 may comprise the access barring check for ACDC subroutine 76. The other acts of Listing 2 may comprise the EPC access control check main routine 70-1. The calls of the subroutines by EPC access control check main routine 70-1 may pass to the subroutines, or require the subroutines to utilize, a "Tbarring" and "AC barring parameter". The "Tbarring" is typically representative of a time value; the "AC barring parameter" typically comprises a value against which a number randomly generated by the subroutine is compared for determining if an access attempt is barred.

Listing 1 and Listing 2 refers to various timers, e.g., timer T302, timer T303, timer T305, timer T306 and timer T308.

Timer T302 starts when receiving RRCConnectionReject while performing RRC connection establishment. In terms of Listing 1, if T302 is still running, this means that RRC connection establishment is not allowed until the timer expires. Timer T303 starts when an access gets barred while performing RRC connection establishment for mobile originating calls. If running, mobile originating calls are still considered to be barred. Timer T305 starts when an access gets barred while performing RRC connection establishment for mobile originating signaling. If running, mobile originating signaling is still considered to be barred. Timer T306 starts when an access gets barred while performing RRC connection establishment for mobile originating CS fallback. If running, mobile originating CS fallback is still considered to be barred. Timer T308 starts when an access gets barred due to Access Control for general Data Connectivity (ACDC). If running, the cell is still barred for an access attempt subject to ACDC.

Listing 1

```
-- ASN1START
SystemInformationBlockType2 ::=      SEQUENCE {
    ac-BarringInfo          SEQUENCE {
        ac-BarringForEmergency              BOOLEAN,
        ac-BarringForMO-Signalling          AC-BarringConfig             OPTIONAL,     -- Need OP
        ac-BarringForMO-Data                AC-BarringConfig             OPTIONAL      -- Need OP
    }                                                                    OPTIONAL,     -- Need OP
    radioResourceConfigCommon           RadioResourceConfigCommonSIB,
    ue-TimersAndConstants               UE-TimersAndConstants,
    freqInfo                            SEQUENCE {
        ul-CarrierFreq                      ARFCN-ValueEUTRA             OPTIONAL,     -- Need OP
        ul-Bandwidth                        ENUMERATED {n6, n15, n25, n50, n75, n100}
                                                                         OPTIONAL,     -- Need OP
        additionalSpectrumEmission          AdditionalSpectrumEmission
    },
    mbsfn-SubframeConfigList            MBSFN-SubframeConfigList                       OPTIONAL, -- Need OR
    timeAlignmentTimerCommon            TimeAlignmentTimer,
    ...,
    lateNonCriticalExtension OCTET STRING (CONTAINING
SystemInformationBlockType2-v8h0-IEs)                                    OPTIONAL,
    [[  ssac-BarringForMMTEL-Voice-r9       AC-BarringConfig             OPTIONAL,     -- Need OP
        ssac-BarringForMMTEL-Video-r9       AC-BarringConfig             OPTIONAL      -- Need OP
    ]],
    [[  ac-BarringForCSFB-r10               AC-BarringConfig             OPTIONAL      -- Need OP
    ]],
    [[  ac-BarringSkipForMMTELVoice-r12     ENUMERATED {true}            OPTIONAL,     -- Need OP
        ac-BarringSkipForMMTELVideo-r12     ENUMERATED {true}            OPTIONAL,     -- Need OP
        ac-BarringSkipForSMS-r12            ENUMERATED {true}            OPTIONAL,     -- Need OP
        ac-BarringPerPLMN-List-r12          AC-BarringPerPLMN-List-r12   OPTIONAL      -- Need OP
    ]],
    [[  voiceServiceCauseIndication-r12     ENUMERATED {true}            OPTIONAL      -- Need OP
    ]],
    [[  acdc-BarringForCommon-r13           ACDC-BarringForCommon-r13    OPTIONAL,     -- Need OP
        acdc-BarringPerPLMN-List-r13        ACDC-BarringPerPLMN-List-r13 OPTIONAL      -- Need OP
    ]],
    [[
        udt-RestrictingForCommon-r13        UDT-Restricting-r13
            OPTIONAL, -- Need OR
        udt-RestrictingPerPLMN-List-r13     UDT-RestrictingPerPLMN-List-r13
            OPTIONAL, -- Need OR
        cIoT-EPS-OptimisationInfo-r13       CIOT-EPS-OptimisationInfo-r13 OPTIONAL,    -- Need OP
        useFullResumeID-r13                 ENUMERATED {true}            OPTIONAL      -- Need OP
    ]]
}
```

-continued

Listing 1

```
SystemInformationBlockType2-v8h0-IEs ::=            SEQUENCE {
    multiBandInfoList           SEQUENCE (SIZE (1..maxMultiBands)) OF
AdditionalSpectrumEmission          OPTIONAL,                -- Need OR
    nonCriticalExtension            SystemInformationBlockType2-v9e0-IEs                    OPTIONAL
}
SystemInformationBlockType2-v9e0-IEs ::= SEQUENCE {
    ul-CarrierFreq-v9e0             ARFCN-ValueEUTRA-v9e0 OPTIONAL,                         -- Cond ul-
FreqMax
    nonCriticalExtension            SEQUENCE { }                                OPTIONAL
}
AC-BarringConfig ::=            SEQUENCE {
    ac-BarringFactor            ENUMERATED {
                                    p00, p05, p10, p15, p20, p25, p30, p40,
                                    p50, p60, p70, p75, p80, p85, p90, p95},
    ac-BarringTime              ENUMERATED {s4, s8, s16, s32, s64, s128, s256,
s512},
    ac-BarringForSpecialAC      BIT STRING (SIZE(5))
}
MBSFN-SubframeConfigList ::= SEQUENCE (SIZE (1..maxMBSFN-Allocations)) OF
MBSFN-SubframeConfig
AC-BarringPerPLMN-List-r12 ::= SEQUENCE (SIZE (1..maxPLMN-r11)) OF AC-
BarringPerPLMN-r12
AC-BarringPerPLMN-r12 ::=           SEQUENCE {
    plmn-IdentityIndex-r12          INTEGER (1..maxPLMN-r11),
    ac-BarringInfo-r12              SEQUENCE {
        ac-BarringForEmergency-r12      BOOLEAN,
        ac-BarringForMO-Signalling-r12  AC-BarringConfig       OPTIONAL,        -- Need OP
        ac-BarringForMO-Data-r12        AC-BarringConfig       OPTIONAL         -- Need OP
    }                                       OPTIONAL,       -- Need OP
    ac-BarringSkipForMMTELVoice-r12         ENUMERATED {true}      OPTIONAL,    --
Need OP
    ac-BarringSkipForMMTELVideo-r12         ENUMERATED {true}      OPTIONAL,    --
Need OP
    ac-BarringSkipForSMS-r12        ENUMERATED {true}      OPTIONAL,            -- Need OP
    ac-BarringForCSFB-r12           AC-BarringConfig       OPTIONAL,            -- Need OP
    ssac-BarringForMMTEL-Voice-r12  AC-BarringConfig       OPTIONAL,            -- Need OP
    ssac-BarringForMMTEL-Video-r12  AC-BarringConfig       OPTIONAL             -- Need OP
}
ACDC-BarringForCommon-r13 ::=           SEQUENCE {
    acdc-HPLMNonly-r13              BOOLEAN,
    barringPerACDC-CategoryList-r13             BarringPerACDC-CategoryList-r13
}
ACDC-BarringPerPLMN-List-r13 ::=        SEQUENCE (SIZE (1.. maxPLMN-r11)) OF
ACDC-BarringPerPLMN-r13
ACDC-BarringPerPLMN-r13 ::=         SEQUENCE {
    plmn-IdentityIndex-r13          INTEGER (1..maxPLMN-r11),
    acdc-OnlyForHPLMN-r13                   BOOLEAN,
    barringPerACDC-CategoryList-r13             BarringPerACDC-CategoryList-r13
}
BarringPerACDC-CategoryList-r13 ::= SEQUENCE (SIZE (1..maxACDC-Cat-r13)) OF
BarringPerACDC-Category-r13
BarringPerACDC-Category-r13 ::= SEQUENCE {
    acdc-Category-r13           INTEGER (1..maxACDC-Cat-r13),
    acdc-BarringConfig-r13          SEQUENCE {
        ac-BarringFactor-r13        ENUMERATED {
                                    p00, p05, p10, p15, p20, p25, p30, p40,
                                    p50, p60, p70, p75, p80, p85, p90, p95},
        ac-BarringTime-r13          ENUMERATED {s4, s8, s16, s32, s64, s128, s256,
s512}
    }                               OPTIONAL        -- Need OP
}
UDT-Restricting-r13 ::= SEQUENCE {
    udt-Restricting-r13         ENUMERATED {true}                   OPTIONAL, --Need OR
    udt-RestrictingTime-r13     ENUMERATED {s4, s8, s16, s32, s64, s128, s256, s512}
OPTIONAL --Need OR
}
UDT-RestrictingPerPLMN-List-r13 ::= SEQUENCE (SIZE (1..maxPLMN-r11)) OF UDT-
RestrictingPerPLMN-r13
UDT-RestrictingPerPLMN-r13 ::= SEQUENCE {
    plmn-IdentityIndex-r13              INTEGER (1..maxPLMN-r11),
    udt-Restricting-r13                 UDT-Restricting-r13    OPTIONAL         --Need OR
}
CIOT-EPS-OptimisationInfo-r13 ::= SEQUENCE (SIZE (1.. maxPLMN-r11)) OF CIOT-
OptimisationPLMN-r13
CIOT-OptimisationPLMN-r13::= SEQUENCE {
        up-CIoT-EPS-Optimisation-r13        ENUMERATED {true}      OPTIONAL,    -- Need OP
        cp-CIoT-EPS-Optimisation-r13        ENUMERATED {true}      OPTIONAL,    -- Need OP
```

Listing 1

| |
|---|
| attachWithoutPDN-Connectivity-r13 ENUMERATED {true}                              OPTIONAL-- Need OP |
| } |
| -- ASN1STOP |

| SystemInformationBlockType2 field descriptions |
|---|
| ac-BarringFactor |
| If the random number drawn by the UE is lower than this value, access is allowed. Otherwise the access is barred. The values are interpreted in the range [0,1): p00 = 0, p05 = 0.05, p10 = 0.10, . . . , p95 = 0.95. Values other than p00 can only be set if all bits of the corresponding ac-BarringForSpecialAC are set to 0. |
| ac-BarringForCSFB |
| Access class barring for mobile originating CS fallback. |
| ac-BarringForEmergency |
| Access class barring for AC 10. |
| ac-BarringForMO-Data |
| Access class barring for mobile originating calls. |
| ac-BarringForMO-Signalling |
| Access class barring for mobile originating signalling. |
| ac-BarringForSpecialAC |
| Access class barring for AC 11-15. The first/leftmost bit is for AC 11, the second bit is for AC 12, and so on. |
| ac-BarringTime |
| Mean access barring time value in seconds. |
| acdc-BarringConfig |
| Barring configuration for an ACDC category. If the field is absent, access to the cell is considered as not barred for the ACDC category in accordance with subclause 5.3.3.13. |
| acdc-Category |
| Indicates the ACDC category as defined in TS 24.105 [72]. |
| acdc-OnlyForHPLMN |
| Indicates whether ACDC is applicable for UEs not in their HPLMN for the corresponding PLMN. TRUE indicates that ACDC is applicable only for UEs in their HPLMN for the corresponding PLMN. FALSE indicates that ACDC is applicable for both UEs in their HPLMN and UEs not in their HPLMN for the corresponding PLMN. |
| additionalSpectrumEmission |
| The UE requirements related to IE AdditionalSpectrumEmission are defined in TS 36.101 [42, table 6.2.4-1]. NOTE 1. |
| attach WithoutPDN-Connectivity |
| If present, the field indicates that attach without PDN connectivity as specified in TS 24.301 [35] is supported for this PLMN. |
| barringPerACDC-CategotyList |
| A list of barring information per ACDC category according to the order defined in TS 22.011 [10]. The first entry in the list corresponds to the highest ACDC category of which applications are the least restricted in access attempts at a cell, the second entry in the list corresponds to the ACDC category of which applications are restricted more than applications of the highest ACDC category in access attempts at a cell, and so on. The last entry in the list corresponds to the lowest ACDC category of which applications are the most restricted in access attempts at a cell. |
| cp-CIoT-EPS-Optimisation |
| This field indicates if the UE is allowed to establish the connection with Control plane CIoT EPS Optimisation, see TS 24.301 [35]. |
| mbsfn-SubframeConfigList |
| Defines the subframes that are reserved for MBSFN in downlink. NOTE 1. |
| multiBandInfoList |
| A list of AdditionalSpectrumEmission i.e. one for each additional frequency band included in multiBandInfoList in SystemInformationBlockType1, listed in the same order. |
| plmn-IdentityIndex |
| Index of the PLMN in plmn-IdentityList included in SIB1. Value 1 indicates the PLMN listed 1st in plmn-IdentityList included in SIB1. Value 2 indicates the PLMN listed 2nd in plmn-IdentityList included in SIB1 and so on. NOTE 1. |
| ssac-BarringForMMTEL-Video |
| Service specific access class barring for MMTEL video originating calls. |
| ssac-BarringForMMTEL-Voice |
| Service specific access class barring for MMTEL voice originating calls. |
| udt-Restricting |
| Value TRUE indicates that the UE should indicate to the higher layers to restrict unattended data traffic TS 22.101 [77] irrespective of the UE being in RRC_IDLE or RRC_CONNECTED. The UE shall not indicate to the higher layers if the UE has one or more Access Classes, as stored on the USIM, with a value in the range 11..15, which is valid for the UE to use according to TS 22.011 [10] and TS 23.122 [11]. |
| udt-RestrictingTime |
| If present and when the udt-Restricting changes from TRUE, the UE runs a timer for a period equal to rand * udt-RestrictingTime, where rand is a random number drawn that is uniformly distributed in the range $0 \le rand < 1$ value in seconds. The timer stops if udt-Restricting changes |

SystemInformationBlockType2 field descriptions (continued)

to TRUE. Upon timer expiry, the UE indicates to the higher layers that the restriction is alleviated.

ul-Bandwidth
Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. NOTE 1.

ul-CarrierFreq
For FDD: If absent, the (default) value determined from the default TX-RX frequency separation defined in TS 36.101 [42, table 5.7.3-1] applies.
For TDD: This parameter is absent and it is equal to the downlink frequency. NOTE 1.

up-CIoT-EPS-Optimisation
This field indicates if the UE is allowed to resume the connection with User plane CIoT EPS Optimisation, see TS 24.301 [35].

useFullResumeID
This field indicates if the UE indicates full resume ID of 40 bits in RRCConnectionResumeRequest.

voiceServieeCauseIndication
Indicates whether UE is requested to use the establishment cause mo-VoiceCall for mobile originating MMTEL voice calls.

```
-- ASN1START
SystemInformationBlockType14-r11 ::= SEQUENCE {
    eab-Param-r11           CHOICE {
        eab-Common-r11          EAB-Config-r11,
        eab-PerPLMN-List-r11    SEQUENCE (SIZE (1..maxPLMN-r11)) OF EAB-ConfigPLMN-r11
    }                       OPTIONAL, -- Need OR
    lateNonCriticalExtension    OCTET STRING        OPTIONAL,
    ...
}
EAB-ConfigPLMN-r11 ::=      SEQUENCE {
    eab-Config-r11          EAB-Config-r11      OPTIONAL -- Need OR
}
EAB-Config-r11 ::=          SEQUENCE {
    eab-Category-r11        ENUMERATED {a, b, c},
    eab-BarringBitmap-r11   BIT STRING (SIZE (10))
}
-- ASN1STOP
```

SystemInformationBlockType14 field descriptions eab-BarringBitmap
Extended access class barring for AC 0-9. The first/leftmost bit is for AC 0, the second bit is for AC 1, and so on.

eab-Category
Indicates the category of UEs for which EAB applies. Value a corresponds to all UEs, value b corresponds to the UEs that are neither in their HPLMN nor in a PLMN that is equivalent to it, and value c corresponds to the UEs that are neither in the PLMN listed as most preferred PLMN of the country where the UEs are roaming in the operator-defined PLMN selector list on the USIM, nor in their HPLMN nor in a PLMN that is equivalent to their HPLMN, see TS 22.011 [10].

eab-Common
The EAB parameters applicable for all PLMN(s).

eab-PerPLMN-List
The EAB parameters per PLMN, listed in the same order as the PLMN(s) listed across the plmn-IdentityList fields in SystemInformationBlockType1.

Listing 2

1> if SystemInformationBlockType2 contains acdc-BarringPerPLMN-List and the acdc-BarringPerPLMN-List contains an ACDC-BarringPerPLMN entry with the plmn-IdentityIndex corresponding to the PLMN selected by upper layers (see TS 23.122 [11], TS 24.301 [35]):
    2> select the ACDC-BarringPerPLMN entry with the plmn-IdentityIndex corresponding to the PLMN selected by upper layers;
    2> in the remainder of this procedure, use the selected ACDC-BarringPerPLMN entry for ACDC barring check (i.e. presence or absence of access barring parameters in this entry) irrespective of the acdc-BarringForCommon parameters included in SystemInformationBlockType2;

Listing 2

```
1> else:
    2> in the remainder of this procedure use the acdc-BarringForCommon (i.e. presence
       or absence of these parameters) included in SystemInformationBlockType2 for
       ACDC barring check;
1> if upper layers indicate that the RRC connection is subject to EAB (see TS 24.301
   [35]):
    2> if the result of the EAB check, as specified in 5.3.3.12, is that access to the cell is
       barred:
        3> inform upper layers about the failure to establish the RRC connection or failure
           to resume the RRC connection with suspend indication and that EAB is
           applicable, upon which the procedure ends;
1> if upper layers indicate that the RRC connection is subject to ACDC (see TS 24.301
   [35]), SystemInformationBlockType2 contains BarringPerACDC-CategoryList, and
   acdc-HPLMNonly indicates that ACDC is applicable for the UE:
    2> if the BarringPerACDC-CategoryList contains a BarringPerACDC-Category entry
       corresponding to the ACDC category selected by upper layers:
        3> select the BarringPerACDC-Category entry corresponding to the ACDC
           category selected by upper layers;
    2> else:
        3> select the last BarringPerACDC-Category entry in the BarringPerACDC-
           CategoryList;
    2> stop timer T308, if running;
    2> perform access barring check as specified in 5.3.3.13, using T308 as "Tbarring" and
       acdc-BarringConfig in the BarringPerACDC-Category as "ACDC barring
       parameter";
    2> if access to the cell is barred:
        3> inform upper layers about the failure to establish the RRC connection or failure
           to resume the RRC connection with suspend indication and that access barring is
           applicable due to ACDC, upon which the procedure ends;
1> else if the UE is establishing the RRC connection for mobile terminating calls:
    2> if timer T302 is running:
        3> inform upper layers about the failure to establish the RRC connection or failure
           to resume the RRC connection with suspend indication and that access barring
           for mobile terminating calls is applicable, upon which the procedure ends;
1> else if the UE is establishing the RRC connection for emergency calls:
    2> if SystemInformationBlockType2 includes the ac-BarringInfo:
        3> if the ac-BarringForEmergency is set to TRUE:
            4> if the UE has one or more Access Classes, as stored on the USIM, with a
               value in the range 11..15, which is valid for the UE to use according to TS
               22.011 [10] and TS 23.122 [11]:
NOTE 1:        ACs 12, 13, 14 are only valid for use in the home country and ACs 11, 15 are
               only valid for use in the HPLMN/ EHPLMN.
                5> if the ac-BarringInfo includes ac-BarringForMO-Data, and for all of these
                   valid Access Classes for the UE, the corresponding bit in the ac-
                   BarringForSpecialAC contained in ac-BarringForMO-Data is set to one:
                    6> consider access to the cell as barred;
            4> else:
                5> consider access to the cell as barred;
    2> if access to the cell is barred:
        3> inform upper layers about the failure to establish the RRC connection or failure
           to resume the RRC connection with suspend indication, upon which the
           procedure ends;
1> else if the UE is establishing the RRC connection for mobile originating calls:
    2> perform access barring check as specified in 5.3.3.11, using T303 as "Tbarring" and
       ac-BarringForMO-Data as "AC barring parameter";
    2> if access to the cell is barred:
        3> if SystemInformationBlockType2 includes ac-BarringForCSFB or the UE does
           not support CS fallback:
            4> inform upper layers about the failure to establish the RRC connection or
               failure to resume the RRC connection with suspend indication and that access
               barring for mobile originating calls is applicable, upon which the procedure
               ends;
        3> else (SystemInformationBlockType2 does not include ac-BarringForCSFB and
           the UE supports CS fallback):
            4> if timer T306 is not running, start T306 with the timer value of T303;
            4> inform upper layers about the failure to establish the RRC connection or
               failure to resume the RRC connection with suspend indication and that access
               barring for mobile originating calls and mobile originating CS fallback is
               applicable, upon which the procedure ends;
1> else if the UE is establishing the RRC connection for mobile originating signalling:
    2> perform access barring check as specified in 5.3.3.11, using T305 as "Tbarring" and
       ac-BarringForMO-Signalling as "AC barring parameter";
    2> if access to the cell is barred:
        3> inform upper layers about the failure to establish the RRC connection or failure
           to resume the RRC connection with suspend indication and that access barring
           for mobile originating signalling is applicable, upon which the procedure ends;
```

Listing 2

```
1>         else if the UE is establishing the RRC connection for mobile originating CS fallback:
    2>     if SystemInformationBlockType2 includes ac-BarringForCSFB:
        3>     perform access barring check as specified in 5.3.3.11, using T306 as "Tbarring"
               and ac-BarringForCSFB as "AC barring parameter";
        3>     if access to the cell is barred:
            4>     inform upper layers about the failure to establish the RRC connection or
                   failure to resume the RRC connection with suspend indication and that access
                   barring for mobile originating CS fallback is applicable, due to ac-
                   BarringForCSFB, upon which the procedure ends;
    2>     else:
        3>     perform access barring check as specified in 5.3.3.11, using T306 as "Tbarring"
               and ac-BarringForMO-Data as "AC barring parameter";
        3>     if access to the cell is barred:
            4>     if timer T303 is not running, start T303 with the timer value of T306;
            4>     inform upper layers about the failure to establish the RRC connection or
                   failure to resume the RRC connection with suspend indication and that access
                   barring for mobile originating CS fallback and mobile originating calls is
                   applicable, due to ac-BarringForMO-Data, upon which the procedure ends;
1>     else if the UE is establishing the RRC connection for mobile originating MMTEL
       voice, mobile originating MMTEL video, mobile originating SMSoIP or mobile
       originating SMS:
    2>     if the UE is establishing the RRC connection for mobile originating MMTEL voice
           and SystemInformationBlockType2 includes ac-BarringSkipForMMTELVoice; or
    2>     if the UE is establishing the RRC connection for mobile originating MMTEL video
           and SystemInformationBlockType2 includes ac-BarringSkipForMMTELVideo; or
    2>     if the UE is establishing the RRC connection for mobile originating SMSoIP or
           SMS and SystemInformationBlockType2 includes ac-BarringSkipForSMS:
        3>     consider access to the cell as not barred;
    2>     else:
        3>     if establishmentCause received from higher layers is set to mo-Signalling
               (including the case that mo-Signalling is replaced by highPriorityAccess
               according to 3GPP TS 24.301 [35] or by mo-VoiceCall according to the
               subclause 5.3.3.3):
            4>     perform access barring check as specified in 5.3.3.11, using T305 as
                   "Tbarring" and ac-BarringForMO-Signalling as "AC barring parameter";
            4>     if access to the cell is barred:
                5>     inform upper layers about the failure to establish the RRC connection or
                       failure to resume the RRC connection with suspend indication and that
                       access barring for mobile originating signalling is applicable, upon which
                       the procedure ends;
        3>     if establishmentCause received from higher layers is set to mo-Data (including
               the case that mo-Data is replaced by highPriorityAccess according to 3GPP TS
               24.301 [35] or by mo-VoiceCall according to the subclause 5.3.3.3):
            4>     perform access barring check as specified in 5.3.3.11, using T303 as
                   "Tbarring" and ac-BarringForMO-Data as "AC barring parameter";
            4>     if access to the cell is barred:
                5>     if SystemInformationBlockType2 includes ac-BarringForCSFB or the UE
                       does not support CS fallback:
                    6>     inform upper layers about the failure to establish the RRC connection or
                           failure to resume the RRC connection with suspend indication and that
                           access barring for mobile originating calls is applicable, upon which the
                           procedure ends;
                5>     else (SystemInformationBlockType2 does not include ac-BarringForCSFB
                       and the UE supports CS fallback):
                    6>     if timer T306 is not running, start T306 with the timer value of T303;
                    6>     inform upper layers about the failure to establish the RRC connection or
                           failure to resume the RRC connection with suspend indication and that
                           access barring for mobile originating calls and mobile originating CS
                           fallback is applicable, upon which the procedure ends;
5.3.3.11                   Access barring check
    1>     if timer T302 or "Tbarring" is running:
        2>     consider access to the cell as barred;
    1>     else if SystemInformationBlockType2 includes "AC barring parameter":
        2>     if the UE has one or more Access Classes, as stored on the USIM, with a value in
               the range 11..15, which is valid for the UE to use according to TS 22.011 [10] and
               TS 23.122 [11], and
    NOTE:      ACs 12, 13, 14 are only valid for use in the home country and ACs 11, 15 are
               only valid for use in the HPLMN/ EHPLMN.
        2>     for at least one of these valid Access Classes the corresponding bit in the ac-
               BarringForSpecialAC contained in "AC barring parameter" is set to zero:
            3>     consider access to the cell as not barred;
        2>     else:
            3>     draw a random number 'rand' uniformly distributed in the range: 0 ≤ rand < 1;
            3>     if 'rand' is lower than the value indicated by ac-BarringFactor included in "AC
                   barring parameter":
                4>     consider access to the cell as not barred;
```

-continued

Listing 2

```
                    3>  else:
                        4>  consider access to the cell as barred;
            1>  else:
                2>  consider access to the cell as not barred;
            1>  if access to the cell is barred and both timers T302 and "Tbarring" are not running:
                2>  draw a random number 'rand' that is uniformly distributed in the range 0 ≤ rand <
                    1;
                2>  start timer "Tbarring" with the timer value calculated as follows, using the ac-
                    BarringTime included in "AC barring parameter":
                    "Tbarring" = (0.7+ 0.6 * rand) * ac-BarringTime;
5.3.3.12                    EAB check
The UE shall:
            1>  if SystemInformationBlockType14 is present and includes the eab-Param:
                2>  if the eab-Common is included in the eab-Param:
                    3>  if the UE belongs to the category of UEs as indicated in the eab-Category
                        contained in eab-Common; and
                    3>  if for the Access Class of the UE, as stored on the USIM and with a value in the
                        range 0..9, the corresponding bit in the eab-BarringBitmap contained in eab-
                        Common is set to one:
                        4>  consider access to the cell as barred;
                    3>  else:
                        4>  consider access to the cell as not barred due to EAB;
                2>  else (the eab-PerPLMN-List is included in the eab-Param):
                    3>  select the entry in the eab-PerPLMN-List corresponding to the PLMN selected
                        by upper layers (see TS 23.122 [11], TS 24.301 [35]);
                    3>  if the eab-Config for that PLMN is included:
                        4>  if the UE belongs to the category of UEs as indicated in the eab-Category
                            contained in eab-Config; and
                        4>  if for the Access Class of the UE, as stored on the USIM and with a value in
                            the range 0..9, the corresponding bit in the eab-BarringBitmap contained in
                            eab-Config is set to one:
                            5>  consider access to the cell as barred;
                        4>  else:
                            5>  consider access to the cell as not barred due to EAB;
                    3>  else:
                        4>  consider access to the cell as not barred due to EAB;
            1>  else:
                2>  consider access to the cell as not barred due to EAB;
5.3.3.13                    Access barring check for ACDC
The UE shall:
            1>  if timer T302 is running:
                2>  consider access to the cell as barred;
            1>  else if SystemInformationBlockType2 includes "ACDC barring parameter":
                2>  draw a random number 'rand' uniformly distributed in the range: 0 ≤ rand < 1;
                2>  if 'rand' is lower than the value indicated by ac-BarringFactor included in "ACDC
                    barring parameter":
                    3>  consider access to the cell as not barred;
                2>  else:
                    3>  consider access to the cell as barred;
            1>  else:
                2>  consider access to the cell as not barred;
            1>  if access to the cell is barred and timer T302 is not running:
                2>  draw a random number 'rand' that is uniformly distributed in the range 0 ≤ rand <
                    1;
                2>  start timer "Tbarring" with the timer value calculated as follows, using the ac-
                    BarringTime included in "ACDC barring parameter":
                    "Tbarring" = (0.7+ 0.6 * rand) * ac-BarringTime.
```

Embodiment 2

A second example embodiment and mode is illustrated with reference to the radio communications system 20-2 of FIG. 1-2, the access node 22-2 and wireless terminal 26-2 of FIG. 2-2, the access control program 64-2 of FIG. 3-2; and the access control procedure 65-2 of FIG. 4-2. FIG. 1-2 particularly shows a network architecture for the 5G network, where the core network is 5GCN, providing 5G services. In this case, the 5G gNB 22-2 is capable of connecting only to 5GCN (not to EPC). The UE 26-2 shown in FIG. 2-2 supports 5G features and may also support LTE/LTE-A capabilities. However, when connected to this gNB 22-2, the UE 26-2 may disable such LTE/LTE-A capabilities.

The access controller 60-2 of FIG. 2-2 is shown as making an access control decision using access control information included in broadcasted system information and an access category number. As described herein, the access category number is dependent upon both a type of access attempt and a condition related to the wireless terminal. Correspondingly, the system information generator 66 of FIG. 2-2 is shown as generating system information that includes access control information.

FIG. 3-2 shows that the access control program 62-2 executed by access controller 60-2 of FIG. 2-2 comprises 5G access control check main routine 70-2 and access barring check subroutine 72. The 5G access control check main routine 70-2 utilizes 5G access control information 64-2.

Figure 5A:
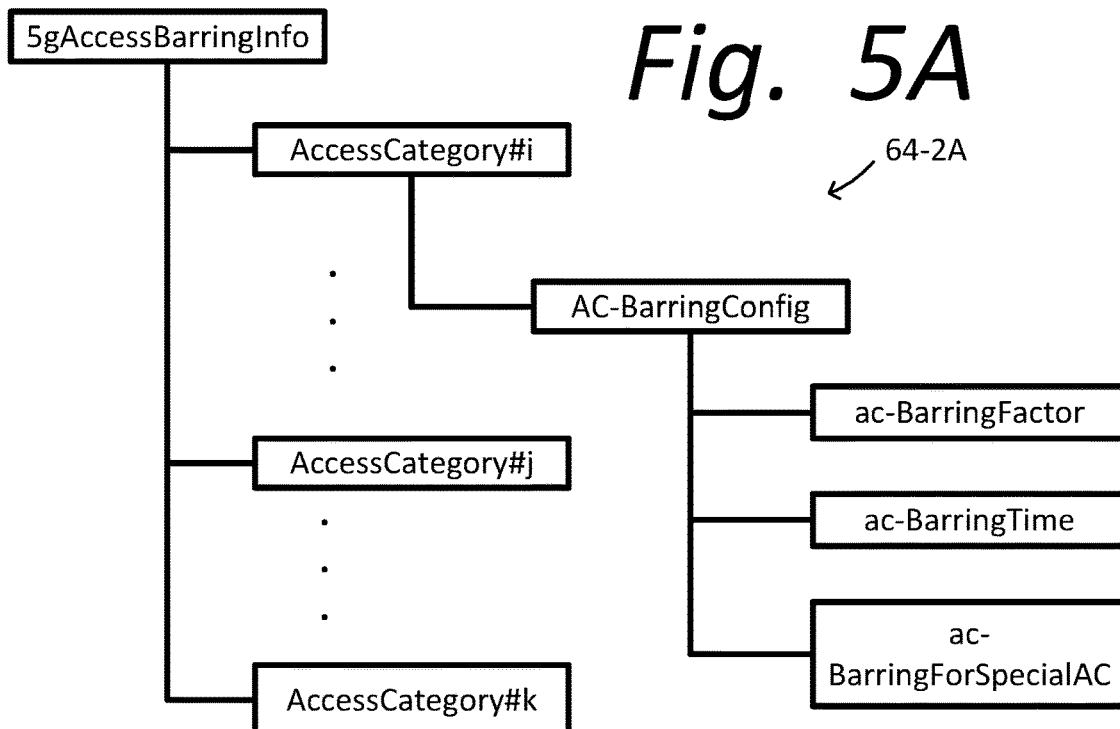
FIG. 5A, FIG. 5B, and FIG. 5C are diagrammatic views showing differing example, alternative formats of 5G access control information.
Figure 5B:
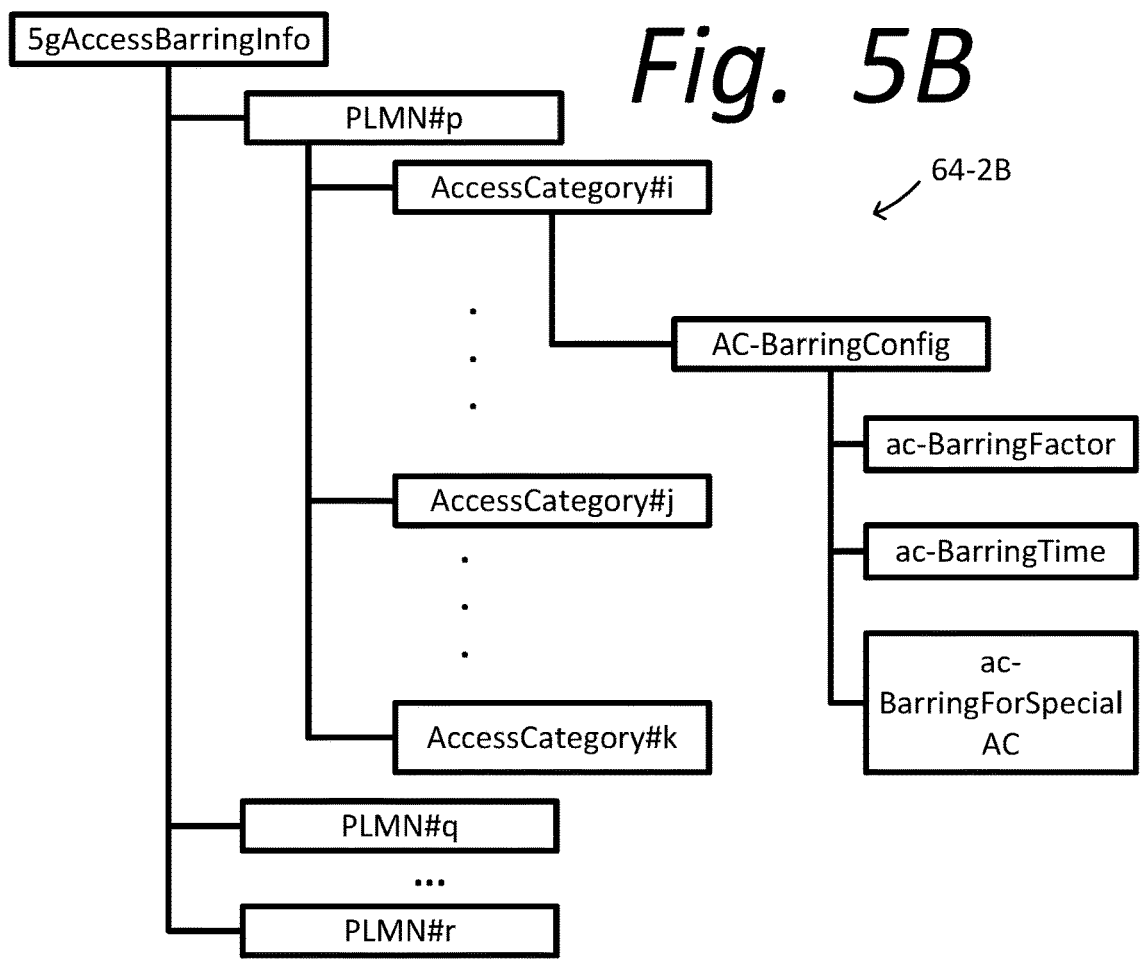
Figure 5C:
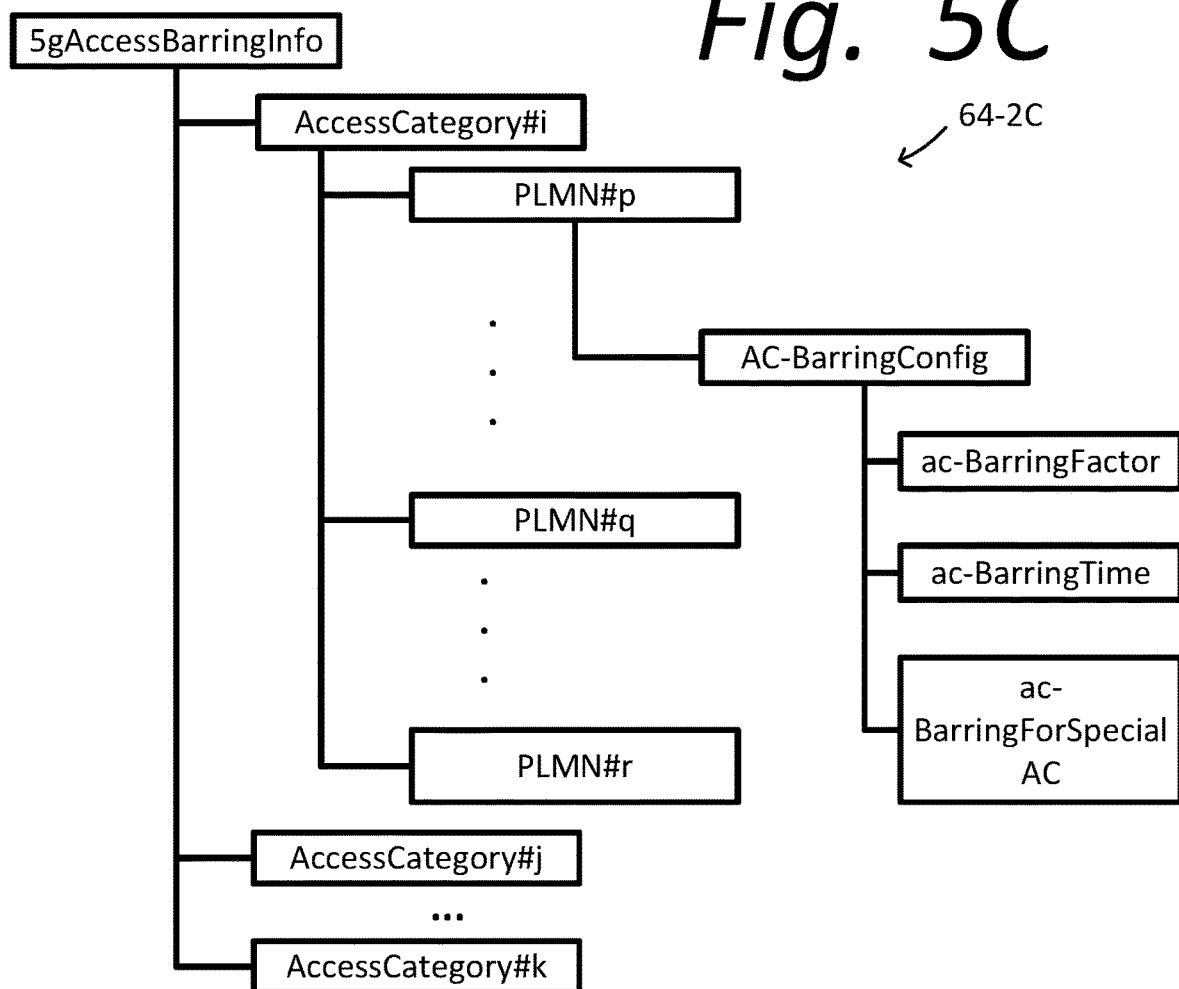

Differing example, alternative formats of the 5G access control information 64-2 are shown in FIG. 5A, FIG. 5B, and FIG. 5C.

The access control program 62-2 shown in FIG. 3-2 for the second example embodiment and mode also includes categorization routine 80. The categorization routine 80 utilizes 5G category configuration information 82. In an example implementation, the 5G category configuration information 82 comprises both type of access attempt information and information concerning conditions related to the UE (wireless terminal). Table 1-1 below shows a generic implementation of the 5G category configuration information 82, while Table 1-2 below shows a specific example implementation of the generic Table 1-1 with sample entries for the type of access attempts and the conditions related to the UE.

In more detail, the access control procedure 65-2 performed upon execution of the 5G access control check main routine 70-2 is shown in FIG. 4-2. As act 4-2-0, an indication of an access attempt is received by the access control program 62-2. As used herein, an indication of an access attempt may be received when an access attempt is generated for any reason, such as (for example) by an application (stored in applications memory 58), e.g., upon requesting a service or connection for performance of the application, or for other reason associated with operation of the wireless terminal 26-2 (such as, for example, a tracking area update). Upon receiving an access attempt, as act 4-2-1 the categorization routine 80 categorizes the access attempt using the 5G category configuration information 82. In an example implementation, the categorization routine 80 uses both the type of access attempt information and information concerning conditions related to the UE as understood with reference, for example, to Table 1-1 and Table 1-2. As a result of act 4-2-1, the categorization routine 80 outputs an access category number. As act 4-2-2 the 5G access control check main routine 70-2 uses both the access category number and the access control information 64-2 to determine whether the access attempt is barred. If the decision of act 4-2-2 is that the access request is not barred, then as act 4-2-3 the access is permitted (e.g., not barred). Otherwise, if the decision of act 4-2-2 is that the access request is barred, then as act 4-2-4 the access is not permitted.

As mentioned above, Table 1-1 is a generic structure of the 5G access category configuration information 82. In Table 1-1, the column "type of access attempt" specifies the classification of the access attempt (such as, for sake of example, "emergency call", and "mobile-originated signaling") and the column "Conditions related to UE" may indicate any additional conditions that apply to classify the access attempt. When an access attempt is generated, the UE may use a table such as Table 1-1 or Table 1-2 to determine the access category by finding the suitable access category number whose "Conditions related to UE" and "Type of access attempt" both match.

TABLE 1-1

| Access category number | Conditions related to UE | Type of access attempt |
|---|---|---|
| 0 | (condition for access category 0) | (attempt type for access category 0) |
| 1 | (condition for access category 1) | (attempt type for access category 1) |
| 2 | (condition for access category 2) | (attempt type for access category 2) |
| 3 | (condition for access category 3) | (attempt type for access category 3) |
| 4 | (condition for access category 4) | (attempt type for access category 4) |
| 5 | (condition for access category 5) | (attempt type for access category 5) |
| ... | | |
| N | (condition for access category n) | (attempt type for access category n) |

The operation of categorizing an access attempt may be explained using an exemplary implementation of the 5G access category configuration information shown in Table 1-2. Suppose, for example, that the access attempt is a short message service (SMS), that the UE is not configured for delay tolerant service, and the Access Class of the UE is 5. In such case the Access category number is 7. As another example case, if the access attempt is for an emergency call and one of the Access Classes is 11, then the Access category number is 1.

TABLE 1-2

| Access category number | Conditions related to UE | Type of access attempt |
|---|---|---|
| 0 (NOTE 1) | All | MO signalling resulting from paging |
| 1 (NOTE 2) | One or some of Access Classes 11-15 are set. At least one of them is valid in the registered PLMN and justified its priority handling by the registered PLMN with regards to access control. | All |
| 2 (NOTE 3) | UE is configured for delay tolerant service and subject to access control for access category 2, which is judged based on relation of UE's HPLMN and the registered PLMN. | All |
| 3 | All except for the cases of access categories 1-2. | Emergency |
| 4 | All except for the cases of access categories 1-2. | MO signalling |
| 5 | All except for the cases of access categories 1-2. | MMTEL voice |
| 6 | All except for the cases of access categories 1-2. | MMTEL video |

TABLE 1-2-continued

| Access category number | Conditions related to UE | Type of access attempt |
|---|---|---|
| 7 | All except for the cases of access categories 1-2. | SMS |
| 8 | All except for the cases of access categories 1-2. | MO data that do not belong to any other access categories |
| 9-31 | | Reserved standardized access categories |
| 32-63 | All except for the cases of access categories 1-2 and except for roaming-UEs | Based on operator classification |

(NOTE 1)
Access category 0 is not barred.
(NOTE 2)
Access Classes 11 and 15 are valid in Home PLMN only if the EHPLMN list is not present or in any EHPLMN. Access Classes 12, 13 and 14 are valid in Home PLMN and visited PLMNs of home country only. For this purpose the home country is defined as the country of the MCC part of the IMSI. If the barring control information contains flag for "unbarred" for at least one of these valid Access Classes, all access attempts from the UE require priority handling and fall into access category 1. Otherwise the UE does not require priority handling with regards to access control and other access categories apply. Access category 1 is not barred.
(NOTE 3)
The barring parameter for access category 2 is accompanied with information on whether the access control applies to UEs registered in UE's HPLMN/EHPLMN, the most preferred VPLMN, or other PLMNs.

In the case there are more than one access category match, in one non-limiting example configuration, the UE 26-2 may choose the one in the highest order (e.g., listed earlier/higher in the Table 1-2, e.g., with smallest access category number), or alternatively the lowest order in the Table 1-2 (e.g., with the greatest access category number). In this case, choosing either the highest or lowest may be pre-configured or configured by the network through broadcast signal (such as System Information).

The UE 26-2 may then further perform AC Check shown as act 4-2-2 in FIG. 4-2 to determine whether the Access category is barred at this moment. In order to do so, the UE 26-2 may have already received 5G access control information 64-2 broadcasted by the gNB via System Information.

As used herein, the 5G access control information 64-2 is also known as 5gAccessBarringInfo. FIG. 5A shows a first example configuration of 5G access control information 64-2A wherein each access category that is subject to barring is associated with the access barring configuration (AC-BarringConfig). The access barring configuration (AC-BarringConfig) includes the ac-barring parameters such as ac-BarringFactor, ac-BarringTime, and ac-BarringForSpecialAC, all as previously described.

Only the access category numbers that are potentially subject to barring are included in the access control information 64-2: any access category that is not potentially subject to barring is not included. For example, FIG. 5A shows that each of AccessCategory #i, AccessCategory #j, and AccessCategory #k may be potentially subject to barring. It should be understood that for FIG. 5A each of AccessCategory #j, and AccessCategory #k have the AC-BarringConfig information elements in the same manner as shown in the tree like structure for AccessCategory #i, but with barring values for the respective AccessCategory #j, and AccessCategory #k.

By "potentially subject to barring" is meant that the access category may or may not be barred depending on the evaluation of the subroutine (access barring check subroutine 72) that may be invoked by the 5G access control check main routine 70-2. As such, whether the access category is barred may in turn depend on the ac-barring parameters such as ac-BarringFactor, ac-BarringTime, and ac-BarringForSpecialAC as evaluated by the appropriate subroutine. For example, when the determined access category is one of the access categories listed in the 5gAccessBarringInfo, the UE may apply (for example) the associated access barring configuration, per "5.3.3.11 Access barring check" in Listing 2 as discussed in conjunction with embodiment 1.

In view of the foregoing, it will be appreciated that access node 22-2 of FIG. 2-2 may generate access control information in a particular format. In particular, the system information generator 66 of access node 22-2 may generate an access control information element (e.g., AC-BarringConfig) comprising access control information. The access control information element may comprise: one or more access category numbered information elements (e.g., AccessCategory #i, AccessCategory #j, and AccessCategory #k) which identify respective one or more access categories which are subject to potential barring from access; and for each access category numbered information element, one or more access control parameter information elements (e.g., ac-BarringFactor, ac-BarringTime, and ac-BarringForSpecialAC) configured to be used for evaluation by a wireless terminal in making an access control decision. The node transmitter 34 is configured to transmit the access control information element over the radio interface to the wireless terminal 26-2.

In one network deployment configuration, the gNB/RAN may be shared by more than one operator. In order to support independent access control scheme for each operator, 5gAccessBarringInfo may be constructed in the manner shown in FIG. 5B, where for each Public Land Mobile Network (PLMN) identifying a network operator, barred access categories and associated access barring configurations are specified. Thus, in FIG. 5B, a first or upper tier grouping is based on PLMN number and the second tier grouping is based on access category number. FIG. 5B shows information elements for each of PLMN #p, PLMN #q, and PLMN #r. It should be understood that for FIG. 5B each of PLMN #p, PLMN #q, and PLMN #r have an associated one or more access category information elements, such as AccessCategory #i, AccessCategory #j, and AccessCategory #k shown only for PLMN #p. The access category numbers associated with different PLMNs may be different, but the same type of tree structure is applicable.

FIG. 5B thus illustrates that the access control information may comprise identifiers of plural public land mobile network (PLMN) identifiers, and that the one or more access category numbered information elements may be associated with one of the PLMN identifiers. FIG. 5B particularly shows that the one or more access category numbered information elements are associated with one of the PLMN identifiers by being sub-information elements of information elements for the respective PLMN identifiers.

FIG. 5C is an alternative implementation of FIG. 5B, wherein a first or upper tier grouping is based on access category number and the second tier grouping is based on PLMN number. It should be understood that for FIG. 5C each of AccessCategory #i, AccessCategory #j, and AccessCategory #k have an associated one or more access category information elements, such as PLMN #p, PLMN #q, and PLMN #r. Again, the PLMN numbers associated with different access categories may be different, but the same type of tree structure is applicable. FIG. 5C thus illustrates that the one or more access category numbered information elements are associated with one of the PLMN identifiers by information elements for the respective PLMN identifiers being sub-information elements of a respective one of the one or more access category numbered information elements.

The 5G gNB 22-2 may broadcast the 5gAccessBarringInfo information element shown in FIG. 5A, FIG. 5B, or FIG. 5C on its 5G (also referred as New Radio) radio interface. In one non-limiting example implementation, the 5gAccessBarringInfo information element may comprise (e.g., be a part of or included in) a SIB which may or may not be dedicated to access barring purposes. In another example non-limiting implementation the 5gAccessBarringInfo information element may comprise an independent SIB (SIBx) dedicated to access barring purposes.

Figure 6:
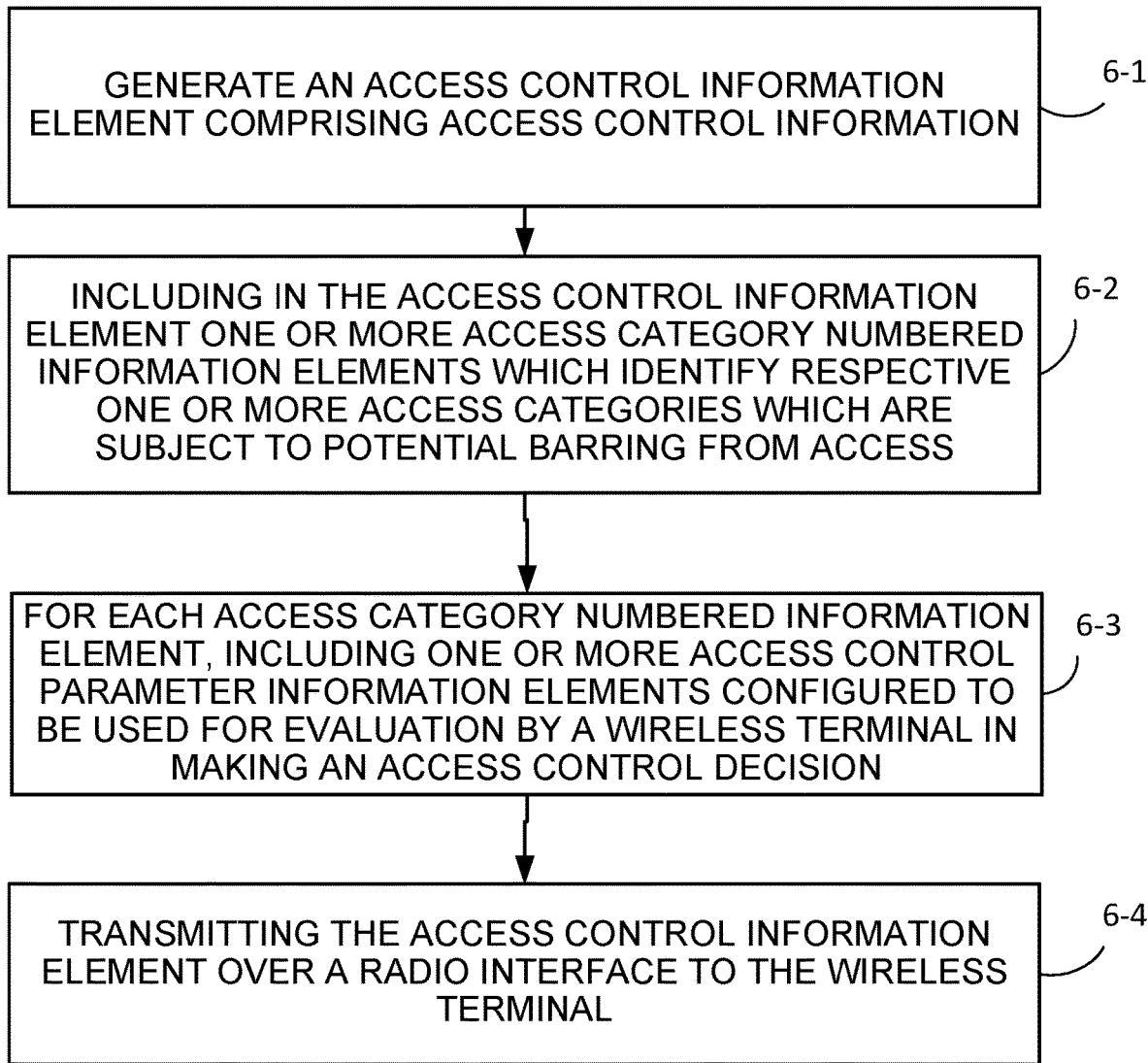
FIG. 6 is a flowchart showing basic, representative acts or steps performed by a 5G access node in accordance with the example embodiment and mode of FIG. 1-2, and particularly for generating an access control information element.

FIG. 6 shows basic, representative acts or steps performed by a 5G access node 22-2 in accordance with the example embodiment and mode of FIG. 1-2, and particularly for generating an access control information element. Act 6-1 comprises using processor circuitry (e.g., node processor 30) to generate an access control information element comprising access control information. Act 6-2 comprises including in the access control information element one or more access category numbered information elements which identify respective one or more access categories which are subject to potential barring from access. Act 6-3 comprises, for each access category numbered information element, including one or more access control parameter information elements configured to be used for evaluation by a wireless terminal in making an access control decision. Act 6-4 comprises transmitting the access control information element over a radio interface to the wireless terminal 26-2.

Embodiment 3

A third example embodiment and mode is illustrated with reference to the radio communications system 20-3 of FIG. 1-3, the access node 22-3 and wireless terminal 26-3 of FIG. 2-3, the access control program 64-3 of FIG. 3-3; and the access control procedure 65-3 of FIG. 4-3. FIG. 1-3 particularly shows a network architecture for embodiment 3, where the core network is 5GCN, providing 5G services. In this case, the LTE eNB 22-3 supports the LTE/LTE-A radio interface and is able to connect to 5GCN 21-3 (and thus also serves as eNB-5G). The UE 26-3 camping on this eNB-5G supports 5G protocols necessary for services provided by the 5GCN core network 21-3. In order to prevent UEs not supporting the 5G features/protocols from camping on this eNB-5B, the eNB-5G may transmit an indication of supported core network (e.g. EPC or 5GCN) via a broadcasted manner (e.g. in Master Information Block (MIB) or in at least one SIB) so that the UE that does not support 5G may be motivated to seek an LTE cell instead.

In the network configuration of FIG. 1-3 and in Embodiment 3, due to the core network capabilities, the 5G (unified) access control scheme disclosed in Embodiment 2 may be used. Namely, the eNB-5G 22-3 may broadcast the 5gAccessBarringInfo information element shown in FIG. 5A, FIG. 5B, or FIG. 5C on its LTE/LTE-A radio interface. In one configuration, the information element is a part of an existing LTE/LTE-A SIB, such as SIB2. In another configuration, it is included in an independent SIB (SIBx). The UE procedure for receiving the SIB and the actions on an access attempt may be the same as described in Embodiment 2.

Like the second embodiment, the access controller 60-3 of FIG. 2-3 is shown as making an access control decision using access control information included in broadcasted system information and an access category number. As described herein, the access category number is dependent upon both a type of access attempt and a condition related to the wireless terminal.

FIG. 3-3 shows that the wireless terminal 26-3 of FIG. 2-3 may execute a network detection routine 84 to determine to which and what type of network the wireless terminal 26-3 is in communication. Execution of the network detection routine 84 may comprise receipt of an indication of supported core network (e.g. EPC or 5GCN) via a broadcasted manner (e.g. in Master Information Block (MIB) or in at least one SIB) from the eNB-5G.

The access control procedure 65-3 of FIG. 4-3 is essentially the same as the access control procedure 65-2 of FIG. 4-2. The acts of FIG. 4-3 are identified as 4-3-*x*, but are essentially the same as the acts 4-2-*x* of FIG. 4-2.

Embodiment 4

A fourth example embodiment and mode is illustrated with reference to the radio communications system 20-4 of FIG. 1-4, the access node 22-4 and wireless terminal 26-4-eLTE of FIG. 2-3, the access control program 64-4 of FIG. 3-4; and the access control procedure 65-4 of FIG. 4-4. FIG. 1-4 particularly shows the network architecture of the fourth embodiment, where the eNB-5G 22-4 is connected to both EPC CN 21-4-EPC and 5GCN 21-4-5GCN. Similar to Embodiment 3, the eNB-5G 22-4 may broadcast (e.g. in MIB or SIB) the indication of supported core networks (indicating support of both EPC and 5GCN).

In this embodiment, the eNB-5G 22-4 may broadcast the EPC access control information, such as SIB2 and/or SIB14 disclosed in the Embodiment 1, in order to support access control for EPC. In parallel, the eNB-5G 22-4 may also broadcast the 5G access category configuration information as disclosed in Embodiment 2 in order to support access control for 5GCN. Accordingly, to illustrate the parallel broadcast of different types of system information, the system information generator 66 of FIG. 2-4 as shown as comprising LTE system information generator 66-LTE and 5G system information generator 66-5G. The LTE system information may be included in an existing LTE/LTE-A SIB (e.g. SIB2). As described in Embodiment 3, the 5G access category configuration information may be incorporated into an existing LTE/LTE-A SIB (e.g. SIB2) or may be included in an independent SIB (SIBx).

As shown in FIG. 1-4, two types of UEs or wireless terminals that may camp on eNB-5G 22-4: UEs that support only EPC (such as UE 26-4-LTE of FIG. 1-4) and UEs that support both EPC and 5GCN (such as UE 26-4-eLTE of FIG. 1-4). Of these two UE types, the LTE-UE 26-4-LTE may be able to camp on the eNB-5G but may be able to receive only services from EPC. For this reason, the LTE-UE 26-4-LTE may process only the EPC access control information and follow the UE procedure upon an arrival of an access attempt as specified in Embodiment 1. On the other hand, due to its dual core network connectivity, the UE 26-4-eLTE may be subject to access control from either or both of EPC core network 21-4-EPC and core network 21-4-5GCN. Therefore, the wireless terminal 26-4-eLTE may process the EPC access control information as well as the 5G access category configuration information (for 5GCN). The access control program 62-4 of FIG. 3-4 and the access control procedure 65-4 of FIG. 4-4 described herein are thus program and procedure executed/performed by wireless terminal 26-4-eLTE.

The access controller 60-4 of the wireless terminal 26-4-eLTE of FIG. 2-4 is shown as making an aggregated access control decision. FIG. 3-4 shows that the access control program 62-4 executed by access controller 60-4 of FIG. 2-4 comprises the access control program 62-1 (shown in FIG. 3-1, which is an access control program for EPC), the access control program 62-2 (shown in FIG. 3-1, which is an access control program for 5G), and multicore network aggregated access control routine 90 (described below).

The access control procedure 65-1 performed upon execution of the access control program 62-4 of FIG. 3-4 is shown in FIG. 4-4. As act 4-4-1, an indication of an access attempt is received by access control program 62-4. As used herein, an indication of an access attempt may be received when an access attempt is generated for any reason, such as (for example) by an application (stored in applications memory 58), e.g., upon requesting a service or connection for performance of the application, or for other reason associated with operation of the wireless terminal 26 (such as, for example, a tracking area update). Upon receiving an access attempt, the access control program 62-4 executes both act 4-4-2 and 4-4-3, in parallel (either essentially simultaneously or consecutively). Act 4-4-2 comprises executing the EPC access control program 62-1; act 4-4-3 comprises executing the 5G access control program 62-2. Execution of the EPC access control program 62-1 results in an EPC access control decision, which EPC access control decision is either "barred" or "not barred". Likewise, execution of the 5G access control program 62-2 results in a 5G access control decision, which 5G access control decision is either "barred" or "not barred". Act 4-4-4 comprises execution of the multi core network aggregated access control routine 90. Execution of the multicore network aggregated access control routine 90 utilizes as inputs both the EPC access control decision and the 5G access control decision, and possibly/optionally other inputs (e.g., configured parameter(s) or configured information).

FIG. 4-4 thus illustrates the procedure for the wireless terminal 26-4-eLTE upon an arrival of an access attempt, wherein the access attempt is evaluated by two branches, the AC procedure for EPC (Embodiment 1) as act 4-4-2 and the AC procedure for 5GCN (Embodiment 2) as act 4-4-3. For this purpose, the wireless terminal 26-4-eLTE may have been pre-configured with the 5G access category configuration information as disclosed in Embodiment 2.

For such an access attempt, each of those two branches, e.g., access control program 62-1 of act 4-4-2 and access control program 62-2 of act 4-4-3, may generate their respective access decisions, such as access allowed (not barred) or access not allowed (barred). The decisions from the two branches may be fed into the multi core network aggregated access control routine 90, so that act 4-4-4 of FIG. 4-4 is performed in order to generate an aggregated access control decision.

There are the following four cases for the input of the Multi core network access decision:
Case 1: Barred both by EPC and 5GCN
Case 2: Barred by EPC, not barred by 5GCN
Case 3: Not barred by EPC, barred by 5GCN
Case 4: Not barred by either EPC or 5GCN In case of Case 1, the access attempt is barred. The wireless terminal 26-4-eLTE may cancel or postpone the attempt.

For Case 2 or Case 3, in one non-limiting example implementation, the 26-4-LTE may fallback to whichever network allowed the access and proceed to initiating access through that allowing network. In another configuration, the wireless terminal 26-4-eLTE may be configured with a set of configuration parameters to determine if the allowed network is suitable. For example, access attempts for certain types of applications/services may be only available in 5GCN (or EPC). In this case, the configuration parameters may instruct the wireless terminal 26-4-eLTE the suitability of the core network per application/service. If suitable, the wireless terminal 26-4-eLTE may proceed in initiating access through that allowing network, otherwise, it may consider the access attempt is barred.

For Case 4, in one non-limiting example configuration, the choice of the core network may be pre-configured in the wireless terminal 26-4-eLTE. For instance, the wireless terminal 26-4-eLTE may automatically choose to access 5GCN (or EPC). In another example implementation, another set of configuration parameters may indicate the priorities of the core networks. In some example implementations, this set of configuration parameters may be also per application/service as described above.

The configuration parameters for Case 2, 3 or 4 may be preloaded into the wireless terminal 26-4-eLTE or transmitted (broadcast or unicast) by eNG-5G.

Thus, the terminal processor 40 (e.g., access controller 60-4) of wireless terminal 26-4-eLTE is configured to perform a first access control procedure configured for a first core network and to obtain therefrom a first access control decision; perform a second access control procedure configured for a second core network and to obtain therefrom a second access control decision; and then make an aggregated access control decision dependent at least in part on the first access control decision and the second access control decision, the aggregated access control decision determining an appropriate one of the first core network and the second core network. For example, with reference to FIG. 4-4 as a non-limiting example, the first access control procedure may result from execution of the LTE access control program 62-1 (e.g., act 4-4-2) and the first access control decision may an LTE access control decision of either barred or not barred; the second access control procedure may result from execution of the 5G access control program 62-2 (e.g., act 4-4-3) and the second access control decision may a 5G access control decision of either barred or not barred; and the aggregated access control decision may be obtained upon execution of multicore network aggregated access control routine 90. The terminal transmitter 44 of wireless terminal 26-4-eLTE is configured to transmit, over a radio interface, an access request to the appropriate core network.

It should be understood that, although FIG. 1-4 shows the first core network is being a 4G LTE core network and the second core network as being a 5G core network, that the network selection of the technology disclosed herein is not limited to any specific one or more types networks, but that the technology disclosed herein may be applicable to other types of existing or here-after developed core networks.

As understood from FIG. 4-4, and particularly the discussion of case 2 and case 3 above, when one of the first access control decision and the second access control decision is a negative decision and another of the first access control decision and the second access control decision is a positive decision (e.g., a case 2 or case 3 split decision), the access controller 60-4 is configured to make the aggregated access control decision to initiate the access request to whichever of the first core network and the second core network is the appropriate core network as indicated by the positive decision. Moreover, in a split decision situation such as case 2 or case 3, the access controller 60-4 may make the aggregated access control decision not only on the first access control decision and the second access control decision, but may also make the aggregated access control decision based on a parameter configured at the wireless terminal. For example, such parameter configured at the wireless terminal may indicate whether the appropriate core network, although passing the case 2/case 3 analysis, is nevertheless suitable for the access request. As mentioned above, for example, it may be that, under certain circumstances, although one of the EPC access control program 62-1 and the 5G access control program 62-2 indicates that their respective core networks are appropriate, the configured parameter may nevertheless preclude or override sending an access request to the supposedly appropriate network at this particular point in time. Such preclusion or override may be based, for example, upon whether the appropriate core network is suitable for a service or application associated with the access request.

The multi core network aggregated access control routine 90 and act 4-4-4 may use configuration information for case 4 as well, e.g., when both the first access control decision and the second access control decision are positive decisions. For case 4 the access controller 60-4 upon executing the multi core network aggregated access control routine 90 as act 4-4-4 may make the aggregated access control decision based at least in part on configuration information. For example, as act 4-4-4 the access controller 60-4 may make the aggregated access control decision based on configuration information which indicates a relative priority of the first core network and the second core network. As a non-limiting example, when the first core network is a 4G LTE core network and the second core network is a 5G core network, the configuration information utilized by multicore network aggregated access control routine 90 in act 4-4-4 may indicate that the 5G core network is to be selected as the appropriate core network over the 4G core network.

As indicated above and illustrated in FIG. 3-4, the access control program 62-4 of embodiment 4 executes both the EPC access control program 62-1 and the 5G access control program 62-2. The access control program 62-4 may perform the first access control procedure (e.g., EPC access control program 62-1) using access control barring parameters, with the access control barring parameters being obtained from broadcasted system information obtained from the first core network (as described in embodiment 1). The access control program 62-4 perform the second access control procedure (e.g., 5G access control program 62-2) using access control information included in broadcasted system information and an access category number, with the access category number being dependent upon both a type of access attempt and a condition related to the wireless terminal (as described in embodiment 2).

It should be noted that the procedure illustrated in FIG. 4-4 may be implemented in a different manner but logically equivalent. Specifically, upon arrival of an access attempt 4-4-1, a first access control procedure (one of the access control procedures, act 4-4-2 or act 4-4-3) may be selected and performed, and then if the decision is positive (not barred), the wireless terminal 26-4-eLTE may proceed to initiating the access request to the core network corresponding the first access control procedure. The wireless terminal 26-4-eLTE may perform the second access control procedure (the access control procedure not selected for the first access control procedure) only if the first access control procedure results in a negative decision. If the second access control procedure results in a positive decision, the wireless terminal 26-4-eLTE may proceed to initiating the access request to the core network corresponding the second access control procedure. Otherwise, the access attempt 4-4-1 may be considered to be barred. In one configuration, the order of performing the access control procedures for multiple core networks may be pre-configured, or configured by eNB-5G 22-4 transmitting (unicast or broadcast) a set of configuration parameters. In addition, in some configuration the wireless terminal 26-4-eLTE may be pre-configured or configured by eNB-5G 22-4 to use a subset of the access control procedures for making an access control decision. In this case, the access control decision may be made only by the access control procedure(s) in this subset.

Figure 7:
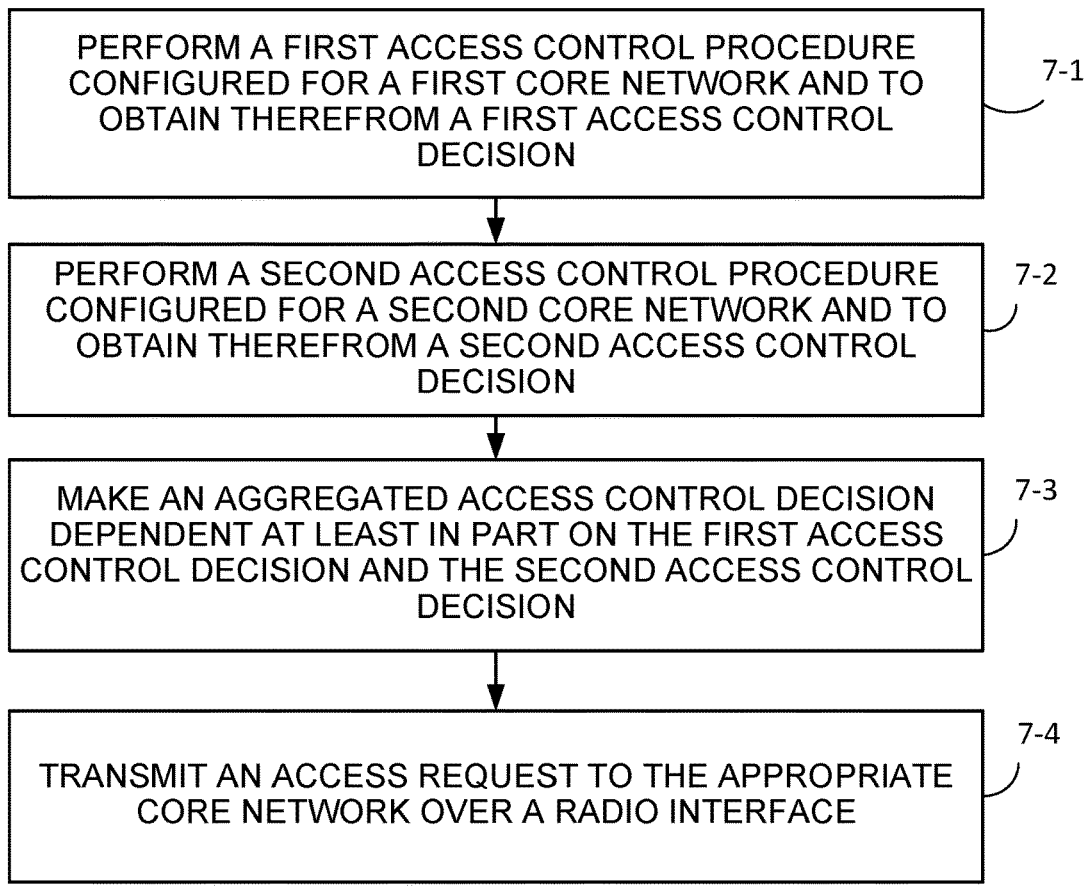
FIG. 7 is a flowchart showing basic, representative acts or steps performed by an eLTE wireless terminal in accordance with the example embodiment and mode of FIG. 1-4.

FIG. 7 shows example, representative acts or steps performed by the wireless terminal 26-4-eLTE in an example embodiment and mode. Act 7-1 comprises performing a first access control procedure configured for a first core network and to obtain therefrom a first access control decision. See, for example, act 4-4-2 of FIG. 4-4. Act 7-2 comprises performing a second access control procedure configured for a second core network and to obtain therefrom a second access control decision. See, for example, act 4-4-3 of FIG. 4-4. Act 7-3 comprises making an aggregated access control decision dependent at least in part on the first access control decision and the second access control decision, See, for example, act 4-4-4 of FIG. 4-4. The aggregated access control decision determines an appropriate one of the first core network and the second core network. Act 7-1 through act 7-3 may be performed by the processor circuitry of wireless terminal 26-4-eLTE, e.g., by access controller 60-4. Act 7-4 comprises transmitting, over a radio interface, an access request to the appropriate core network. The representative acts or steps of FIG. 7 are described as being performed by the wireless terminal 26-4-eLTE, but it should be understood that these basic acts or steps may be performed by any wireless terminal which is making an access control decision when any two or more core networks are involved. That is, the acts of FIG. 7 may be performed in conjunction with an access control decision between any two core networks, not just between LTE and 5G core networks.

Features of any one or more of the example embodiments and modes described herein may be combined with any other example embodiment(s) and mode(s) described herein.

Figure 8:
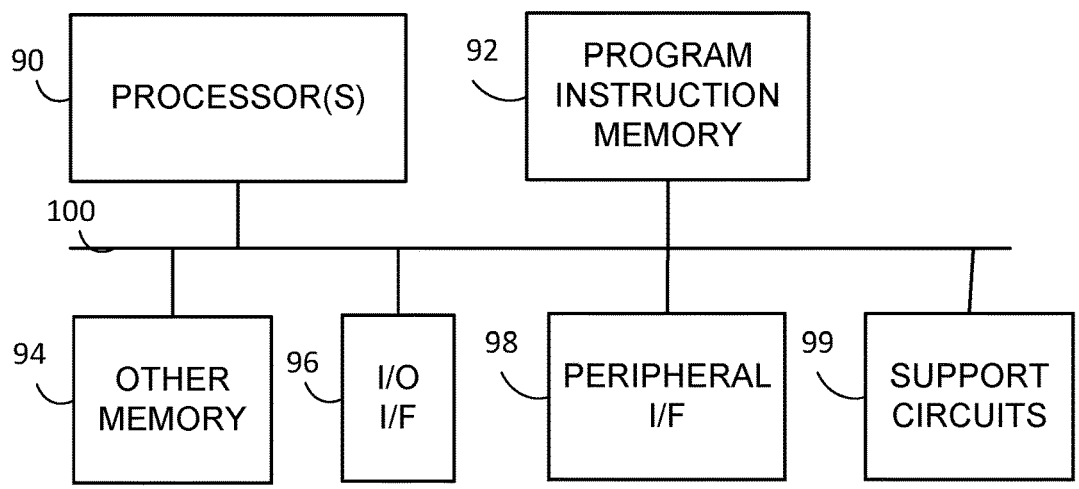
FIG. 8 is a diagrammatic view showing example electronic machinery which may comprise node electronic machinery or terminal electronic machinery.

Certain units and functionalities of access node 22 and wireless terminal 26 of the various foregoing example embodiments and modes are, in example embodiments, implemented by electronic machinery, computer, and/or circuitry. For example, the node processors 30 and terminal processors 40 of the example embodiments herein described and/or encompassed may be comprised by the computer circuitry of FIG. 8. FIG. 8 shows an example of such electronic machinery or circuitry, whether node or terminal, as comprising one or more processor(s) circuits 91, program instruction memory 92; other memory 94 (e.g., RAM, cache, etc.); input/output interfaces 96; peripheral interfaces 98; support circuits 99; and busses 100 for communication between the aforementioned units.

The program instruction memory 92 may comprise coded instructions which, when executed by the processor(s), perform acts including but not limited to those described herein. Thus is understood that each of node processor 30 and terminal processor 40, for example, comprise memory in which non-transient instructions are stored for execution.

The memory 94, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 99 are coupled to the processors 91 for supporting the processor in a conventional manner. These circuits include cache, power supplies, clock circuits, input/output circuitry and subsystems, and the like.

The technology of this application thus encompasses but is not limited to the following example embodiments, example features, and example advantages:

Example Embodiment 1

A radio access node comprising:
receiver circuitry and transmitter circuitry configured to communicate across a radio interface with a wireless terminal;
processor circuitry configured to:
communicate with at least one core network;
transmit access control information to the wireless terminal with regard to the core network.

Example Embodiment 2

The radio access node of Example Embodiment 1, wherein the access control information is transmitted on a broadcast channel.

Example Embodiment 3

The radio access node of Example Embodiment 1, wherein the core network is Evolved Packet Core (EPC) and the format and the contents of the access control information is designated for EPC.

Example Embodiment 4

The radio access node of Example Embodiment 1, wherein the core network is 5th Generation Core Network (5GCN) and the format and the contents of the access control information is designated for 5GCN.

Example Embodiment 5

The radio access node of Example Embodiment 1, wherein the access control information comprises a list of access category identifiers, each of which is associated with access barring information, access barring information comprising parameters for the wireless terminal to determine if an access attempt is allowed per the access category specified by the corresponding access category identifier.

Example Embodiment 6

The radio access node of Example Embodiment 1, wherein the access control information comprises a list of network identifiers of the networks that utilize the radio access node, each of the network identifier associated with the access barring information.

Example Embodiment 7

The radio access node of Example Embodiment 1, wherein the access control information comprises a list of access category identifiers, each of which is associated with a list of network identifiers, each of the network identifiers being associated with the access barring information.

Example Embodiment 8

The radio access node of Example Embodiment 1, wherein the radio access node transmits access category configuration information, the access category configuration information comprising a list of access category identifiers, each of which is associated with a set of conditions.

Example Embodiment 9

The radio access node of Example Embodiment 1, wherein the radio access node is connected to plurality of core networks, and the radio access node transmits over the radio interface the access control information for each of the core networks.

Example Embodiment 10

The radio access node of Example Embodiment 9, wherein the format and the contents of the access control information is specific to the corresponding core network.

Example Embodiment 11

The radio access node of Example Embodiment 9, wherein the core networks are EPC and 5GCN.

Example Embodiment 12

The radio access node of Example Embodiment 9, wherein the radio access node transmits a set of configuration parameters that instruct the wireless terminal how to aggregate the multiple access decisions.

Example Embodiment 13

A wireless terminal comprising:
receiver circuitry and transmitter circuitry configured to communicate across a radio interface with radio access nodes;
processor circuitry configured to:
receive access control information from radio access nodes;
upon an event of an access attempt, determine if the access attempt is allowed based on the access control information.

Example Embodiment 14

The wireless terminal of Example Embodiment 13, wherein the access control information is transmitted on a broadcast channel.

Example Embodiment 15

The wireless terminal of Example Embodiment 13, wherein the format and the contents of the access control information is designated for access attempts to Evolved Packet Core (EPC).

Example Embodiment 16

The wireless terminal of Example Embodiment 13, wherein the format and the contents of the access control information is designated for access attempts to 5th Generation Core Network (5GCN).

Example Embodiment 17

The wireless terminal of Example Embodiment 13, wherein the access control information comprises a list of access category identifiers, each of which is associated with access barring information, access barring information comprising parameters for the wireless terminal to determine if an access attempt is allowed per the access category specified by the corresponding access category identifier.

Example Embodiment 18

The wireless terminal of Example Embodiment 13, wherein the access control information comprises a list of network identifiers of the networks that utilize the radio access node, each of the network identifier associated with the access barring information.

Example Embodiment 19

The wireless terminal of Example Embodiment 13, wherein the access control information comprises a list of access category identifiers, each of which is associated with a list of network identifiers, each of the network identifiers being associated with the access barring information.

Example Embodiment 20

The wireless terminal of Example Embodiment 13, wherein the wireless terminal is configured with access category configuration information, the access category configuration information comprising a list of access category identifiers, each of which is associated with a set of conditions.

Example Embodiment 21

The wireless terminal of Example Embodiment 20, wherein the access category configuration information is pre-configured.

Example Embodiment 22

The wireless terminal of Example Embodiment 20, wherein the wireless terminal receives the access category configuration information from the radio access node.

Example Embodiment 23

The wireless terminal of Example Embodiment 20, wherein upon an event of an access attempt the wireless terminal identifies the access category identifier suitable for the access attempt using the access category configuration information.

Example Embodiment 24

The wireless terminal of Example Embodiment 23, wherein the wireless terminal is configured to select one access category identifier when there are multiple suitable access category identifiers.

Example Embodiment 25

The wireless terminal of Example Embodiment 23, wherein using the access control information the wireless terminal further derives an access decision, the access decision indicating either the access category represented by the access category identifier is barred (not allowed) or not barred (allowed).

Example Embodiment 26

The wireless terminal of Example Embodiment 23, wherein the access terminal receives from the radio access node two or more instances of access control information, each of which is designated to a specific core network connected to the radio access node.

Example Embodiment 27

The wireless terminal of Example Embodiment 26, wherein upon an event of an access attempt the wireless terminal derives the access decision for each core network using the designated access configuration information and using the derived access decisions derives an aggregated access decision for the access attempt.

Example Embodiment 28

The wireless terminal of Example Embodiment 27, wherein the wireless terminal is configured with configuration parameters that instruct the wireless terminal how to aggregate the multiple access decisions.

Example Embodiment 29

The wireless terminal of Example Embodiment 28, wherein the configuration parameters are pre-configured in the wireless terminal.

Example Embodiment 30

The wireless terminal of Example Embodiment 28, wherein the wireless terminal receives the configuration parameters from the radio access node.

Example Embodiment 31

A method in an radio access node of a radio communication network that communicates across a radio interface with a wireless terminal comprising:
communicating with at least one core network;
transmitting access control information to the wireless terminal with regard to the core network.

Example Embodiment 32

The method of Example Embodiment 31, wherein the access control information is transmitted on a broadcast channel.

Example Embodiment 33

The method of Example Embodiment 31, wherein the core network is Evolved Packet Core (EPC) and the format and the contents of the access control information is designated for EPC.

Example Embodiment 34

The method of Example Embodiment 31, wherein the core network is 5th Generation Core Network (5GCN) and the format and the contents of the access control information is designated for 5GCN.

Example Embodiment 35

The method of Example Embodiment 31, wherein the access control information comprises a list of access category identifiers, each of which is associated with access barring information, access barring information comprising parameters for the wireless terminal to determine if an access attempt is allowed per the access category specified by the corresponding access category identifier.

Example Embodiment 36

The method of Example Embodiment 31, wherein the access control information comprises a list of network identifiers of the networks that utilize the radio access node, each of the network identifier associated with the access barring information.

Example Embodiment 37

The method of Example Embodiment 31, wherein the access control information comprises a list of access category identifiers, each of which is associated with a list of network identifiers, each of the network identifiers being associated with the access barring information.

Example Embodiment 38

The method of Example Embodiment 31, wherein comprising transmitting access category configuration information, the access category configuration information comprising a list of access category identifiers, each of which is associated with a set of conditions.

Example Embodiment 39

The method of Example Embodiment 31, wherein comprising connecting to plurality of core networks, and the transmitting over the radio interface the access control information for each of the core networks.

Example Embodiment 40

The method of Example Embodiment 39, wherein the format and the contents of the access control information is specific to the corresponding core network.

Example Embodiment 41

The method of Example Embodiment 39, wherein the core networks are EPC and 5GCN.

Example Embodiment 42

The method of Example Embodiment 39, wherein comprising transmitting a set of configuration parameters that instruct the wireless terminal how to aggregate the multiple access decisions.

Example Embodiment 43

A method in a wireless terminal that communicates across a radio interface with radio access nodes comprising:
receiving access control information from radio access nodes;
upon an event of an access attempt, determining if the access attempt is allowed based on the access control information.

Example Embodiment 44

The method of Example Embodiment 43, wherein the access control information is transmitted on a broadcast channel.

Example Embodiment 45

The method of Example Embodiment 43, wherein the format and the contents of the access control information is designated for access attempts to Evolved Packet Core (EPC).

Example Embodiment 46

The method of Example Embodiment 43, wherein the format and the contents of the access control information is designated for access attempts to 5th Generation Core Network (5GCN).

Example Embodiment 47

The method of Example Embodiment 43, wherein the access control information comprises a list of access category identifiers, each of which is associated with access barring information, access barring information comprising parameters for the wireless terminal to determine if an access attempt is allowed per the access category specified by the corresponding access category identifier.

Example Embodiment 48

The method of Example Embodiment 43, wherein the access control information comprises a list of network identifiers of the networks that utilize the radio access node, each of the network identifier associated with the access barring information.

Example Embodiment 49

The method of Example Embodiment 43, wherein the access control information comprises a list of access category identifiers, each of which is associated with a list of network identifiers, each of the network identifiers being associated with the access barring information.

Example Embodiment 50

The method of Example Embodiment 43, wherein the wireless terminal is configured with access category configuration information, the access category configuration information comprising a list of access category identifiers, each of which is associated with a set of conditions.

Example Embodiment 51

The method of Example Embodiment 50, wherein the access category configuration information is pre-configured.

Example Embodiment 52

The method of Example Embodiment 50, wherein comprising receiving the access category configuration information from the radio access node.

Example Embodiment 53

The method of Example Embodiment 50, wherein comprising upon an event of an access attempt identifying the access category identifier suitable for the access attempt using the access category configuration information.

Example Embodiment 54

The method of Example Embodiment 53, wherein comprising selecting one access category identifier when there are multiple suitable access category identifiers.

Example Embodiment 55

The method of Example Embodiment 53, wherein comprising using the access control information further deriving an access decision, the access decision indicating either the access category represented by the access category identifier is barred (not allowed) or not barred (allowed).

Example Embodiment 56

The method of Example Embodiment 53, wherein comprising receiving from the radio access node two or more instances of access control information, each of which is designated to a specific core network connected to the radio access node.

Example Embodiment 57

The method of Example Embodiment 56, wherein comprising upon an event of an access attempt deriving the access decision for each core network using the designated access configuration information and using the derived access decisions derives an aggregated access decision for the access attempt.

Example Embodiment 58

The method of Example Embodiment 57, wherein comprising using configuration parameters that instruct the wireless terminal how to aggregate the multiple access decisions.

Example Embodiment 59

The method of Example Embodiment 58, wherein the configuration parameters are pre-configured in the wireless terminal.

Example Embodiment 60

The method of Example Embodiment 58, wherein comprising receiving the configuration parameters from the radio access node.

Example Embodiment 61

A wireless terminal comprising:
processor circuitry configured to:
  perform a first access control procedure configured for a first core network and to obtain therefrom a first access control decision;
  perform a second access control procedure configured for a second core network and to obtain therefrom a second access control decision;
  make an aggregated access control decision dependent at least in part on the first access control decision and the second access control decision, the aggregated access control decision determining an appropriate one of the first core network and the second core network to make an access request;
transmitter circuitry configured to transmit, over a radio interface, the access request to the appropriate core network.

Example Embodiment 62

The wireless terminal of Example Embodiment 61, wherein the first core network is a 4G LTE core network and the second core network is a 5G core network.

Example Embodiment 63

The wireless terminal of Example Embodiment 61, wherein one of the first access control decision and the second access control decision is a negative decision and another of the first access control decision and the second access control decision is a positive decision, the processor circuitry is configured to make the aggregated access control decision to initiate the access request to whichever of the first core network and the second core network is the appropriate core network as indicated by the positive decision.

Example Embodiment 64

The wireless terminal of Example Embodiment 63, wherein the processor circuitry is further configured to make the aggregated access control decision based on a parameter configured at the wireless terminal.

Example Embodiment 65

The wireless terminal of Example Embodiment 64, wherein the parameter configured at the wireless terminal indicates whether the appropriate core network is suitable for the access request.

Example Embodiment 66

The wireless terminal of Example Embodiment 65, wherein the parameter configured at the wireless terminal indicates whether the appropriate core network is suitable for a service or application associated with the access request.

Example Embodiment 67

The wireless terminal of Example Embodiment 61, wherein when both the first access control decision and the second access control decision are positive decisions, the processor circuitry is configured to make the aggregated access control decision based at least in part on configuration information.

Example Embodiment 68

The wireless terminal of Example Embodiment 67, wherein the configuration information indicates a relative priority of the first core network and the second core network.

Example Embodiment 69

The wireless terminal of Example Embodiment 68, wherein the first core network is a 4G LTE core network and the second core network is a 5G core network, and wherein the configuration information indicates that the 5G core network is to be selected as the appropriate core network over the 4G core network.

Example Embodiment 70

The wireless terminal of Example Embodiment 61, wherein the processor circuitry is configured to:
perform the first access control procedure using access control barring parameters obtained from broadcasted system information obtained from the first core network;
to perform the second access control procedure using access control information included in broadcasted system information and an access category number, the access category number being dependent upon both a type of access attempt and a condition related to the wireless terminal.

Example Embodiment 71

A method in a wireless terminal comprising:
using processor circuitry to:
perform a first access control procedure configured for a first core network and to obtain therefrom a first access control decision;
perform a second access control procedure configured for a second core network and to obtain therefrom a second access control decision;
make an aggregated access control decision dependent at least in part on the first access control decision and the second access control decision, the aggregated access control decision determining an appropriate one of the first core network and the second core network;
transmitting, over a radio interface, an access request to the appropriate core network.

Example Embodiment 72

The method of Example Embodiment 71, wherein the first core network is a 4G LTE core network and the second core network is a 5G core network.

Example Embodiment 73

The method of Example Embodiment 71, wherein one of the first access control decision and the second access control decision is a negative decision and another of the first access control decision and the second access control decision is a positive decision, and wherein the method further comprises using the processor circuitry to make the aggregated access control decision to initiate the access request to whichever of the first core network and the second core network is the appropriate core network as indicated by the positive decision.

Example Embodiment 74

The method of Example Embodiment 73, further comprising using the processor circuitry to make the aggregated access control decision based on a parameter configured at the wireless terminal.

Example Embodiment 75

The method of Example Embodiment 74, wherein the parameter configured at the wireless terminal indicates whether the appropriate core network is suitable for the access request.

Example Embodiment 76

The method of Example Embodiment 75, wherein the parameter configured at the wireless terminal indicates whether the appropriate core network is suitable for a service or application associated with the access request.

Example Embodiment 77

The method of Example Embodiment 71, wherein when both the first access control decision and the second access control decision are positive decisions, and further comprising using the processor circuitry to make the aggregated access control decision based at least in part on configuration information.

Example Embodiment 78

The method of Example Embodiment 77, wherein the configuration information indicates a relative priority of the first core network and the second core network.

Example Embodiment 79

The method of Example Embodiment 78, wherein the first core network is a 4G LTE core network and the second core network is a 5G core network, and wherein the configuration information indicates that the 5G core network is to be selected as the appropriate core network over the 4G core network.

Example Embodiment 80

The method of Example Embodiment 71, further comprising using the processor circuitry to:
perform the first access control procedure using access control barring parameters obtained from broadcasted system information obtained from the first core network;
to perform the second access control procedure using access control information included in broadcasted system information and an access category number, the access category number being dependent upon both a type of access attempt and a condition related to the wireless terminal.

Example Embodiment 81

An access node of a radio access network comprising:
processor circuitry is configured to generate an access control information element comprising access control information, the access control information element comprising:
one or more access category numbered information elements which identify respective one or more access categories which are subject to potential barring from access;
for each access category numbered information element, one or more access control parameter information elements configured to be used for evaluation by a wireless terminal in making an access control decision;
transmitter circuitry configured to transmit the access control information element over a radio interface to the wireless terminal.

Example Embodiment 82

The access node of Example Embodiment 81, wherein the processor circuitry is configured to generate the access control information element for inclusion in system information which is broadcast over the radio interface.

Example Embodiment 83

The access node of Example Embodiment 81, wherein the one or more access control parameter information elements comprise a numerical factor for use by the wireless terminal in comparison to a number randomly generated by the wireless terminal and a wait time.

Example Embodiment 84

The access node of Example Embodiment 81, wherein the one or more access control parameter information elements comprise ac-BarringFactor, ac-BarringTime, and ac-BarringFor SpecialAC.

Example Embodiment 85

The access node of Example Embodiment 81, wherein the access control information comprises identifiers of plural public land mobile network (PLMN) identifiers, and wherein the one or more access category numbered information elements are associated with one of the PLMN identifiers.

Example Embodiment 86

The access node of Example Embodiment 85, wherein the one or more access category numbered information elements are associated with one of the PLMN identifiers by being sub-information elements of information elements for the respective PLMN identifiers.

Example Embodiment 87

The access node of claim Example Embodiment 85, wherein the one or more access category numbered information elements are associated with one of the PLMN identifiers by information elements for the respective PLMN identifiers being sub-information elements of a respective one of the one or more access category numbered information elements.

Example Embodiment 88

A method in an access node of a radio access network comprising:
using processor circuitry to generate an access control information element comprising access control information, the access control information element comprising:
one or more access category numbered information elements which identify respective one or more access categories which are subject to potential barring from access;
for each access category numbered information element, one or more access control parameter information elements configured to be used for evaluation by a wireless terminal in making an access control decision;
transmitting the access control information element over a radio interface to the wireless terminal.

Example Embodiment 89

An access node of a radio access network comprising:
processor circuitry is configured to generate a first access control information element for a first core network and separately generate a second access control information element for a second core network;
the first access control information element comprising access control parameters configured to be used for evaluation by a wireless terminal in making a decision to access the first core network;
the second access control information element comprising access control parameters configured to be used for evaluation by a wireless terminal in making a decision to access the second core network;
transmitter circuitry configured to transmit the first access control information element and the second access control information element over a radio interface to the wireless terminal.

Example Embodiment 90

The access node of Example Embodiment 89, wherein the processor circuitry is configured to generate the access control information elements for inclusion in system information which is broadcast over the radio interface.

Example Embodiment 91

The access node of Example Embodiment 89, wherein at least one of the access control information elements comprises one or more access category numbered information elements which identify respective one or more access categories which are subject to potential barring from access, for each access category numbered information element, one or more access control parameter information elements configured to be used for evaluation by a wireless terminal in making an access control decision.

Example Embodiment 92

The access node of Example Embodiment 91, wherein the one or more access control parameter information elements comprise a numerical factor for use by the wireless terminal in comparison to a number randomly generated by the wireless terminal and a wait time.

Example Embodiment 93

The access node of Example Embodiment 91, wherein the one or more access control parameter information elements comprise ac-BarringFactor, ac-BarringTime, and ac-BarringFor SpecialAC.

Example Embodiment 94

The access node of Example Embodiment 91, wherein the access control information comprises identifiers of plural public land mobile network (PLMN) identifiers, and wherein the one or more access category numbered information elements are associated with one of the PLMN identifiers.

Example Embodiment 95

The access node of Example Embodiment 94, wherein the one or more access category numbered information elements are associated with one of the PLMN identifiers by being sub-information elements of information elements for the respective PLMN identifiers.

Example Embodiment 96

The access node of Example Embodiment 94, wherein the one or more access category numbered information elements are associated with one of the PLMN identifiers by information elements for the respective PLMN identifiers being sub-information elements of a respective one of the one or more access category numbered information elements.

Example Embodiment 97

A method in an access node of a radio access network comprising:
using processor circuitry to generate a first access control information element for a first core network and separately generate a second access control information element for a second core network comprising:
the first access control information element comprising access control parameters configured to be used for evaluation by a wireless terminal in making a decision to access the first core network;
the second access control information element comprising access control parameters configured to be used for evaluation by a wireless terminal in making a decision to access the second core network;
transmitting the first access control information element and the second access control information element over a radio interface to the wireless terminal.

Example Embodiment 98

The method of Example Embodiment 97, wherein the processor circuitry is configured to generate the access control information elements for inclusion in system information which is broadcast over the radio interface.

Example Embodiment 99

The method of Example Embodiment 97, wherein at least one of the access control information elements comprises one or more access category numbered information elements which identify respective one or more access categories which are subject to potential barring from access, for each access category numbered information element, one or more access control parameter information elements configured to be used for evaluation by a wireless terminal in making an access control decision.

Example Embodiment 100

The method of Example Embodiment 97, wherein the one or more access control parameter information elements comprise a numerical factor for use by the wireless terminal in comparison to a number randomly generated by the wireless terminal and a wait time.

Example Embodiment 101

The method of Example Embodiment 100, wherein the one or more access control parameter information elements comprise ac-BarringFactor, ac-BarringTime, and ac-BarringFor SpecialAC.

Example Embodiment 102

The method of Example Embodiment 97, wherein the access control information comprises identifiers of plural public land mobile network (PLMN) identifiers, and wherein the one or more access category numbered information elements are associated with one of the PLMN identifiers.

Example Embodiment 103

The method of Example Embodiment 102, wherein the one or more access category numbered information elements are associated with one of the PLMN identifiers by being sub-information elements of information elements for the respective PLMN identifiers.

Example Embodiment 104

The method of Example Embodiment 102, wherein the one or more access category numbered information elements are associated with one of the PLMN identifiers by information elements for the respective PLMN identifiers being sub-information elements of a respective one of the one or more access category numbered information elements.

Example Embodiment 105

A wireless terminal comprising:
receiver circuitry configured to receive from an access node first access control information and to separately receive from the access node second access control information;
processor circuitry configured to:
perform, based on the first access control information, an access control procedure for a first core network, and initiate an access request for the first core network in case that an access attempt is allowed by the access control procedure for the first core network,
perform, based on the second access control information, an access control procedure for a second core network in case that the access attempt is barred by the access control procedure for the first core network, and initiate an access request for the second core network in case that the access attempt is allowed by the access control procedure for the second core network;

transmitter circuitry configured to transmit the access request for the allowed core network.

Example Embodiment 106

The wireless terminal of Example Embodiment 105, wherein the first core network is 5G Core Network (5GCN) and the second core network is Evolved Packet Core network (EPC).

Example Embodiment 107

A method in a wireless terminal comprising:

receiving from an access node first access control information and separately receiving from the access node second access control information;

performing, based on the first information, an access control procedure for a first core network, and initiate an access request for the first core network in case that an access attempt is allowed by the access control procedure for the first core network, performing, based on the second information, an access control procedure for a second core network in case that the access attempt is barred by the access control procedure for the first core network, and initiate an access request for the second core network in case that the access attempt is allowed by the access control procedure for the second core network;

transmitting the access request for the allowed core network.

Example Embodiment 108

The method of Example Embodiment 107, wherein the first core network is 5G Core Network (5GCN) and the second core network is Evolved Packet Core network (EPC).

Example Embodiment 109

An access node of a radio access network comprising:

processor circuitry configured to generate a first access control information for a first core network and separately to generate a second access control information for a second core network;

the first access control information comprising access control parameters configured to be used for evaluation by a wireless terminal in determining whether an access attempt is allowed or barred for the first core network;

the second access control information comprising access control parameters configured to be used for evaluation by a wireless terminal in determining whether the access attempt is allowed or barred for the second core network;

transmitter circuitry configured to transmit the first access control information and the second access control information over a radio interface to the wireless terminal.

Example Embodiment 110

The access node of Example Embodiment 109, wherein the first core network is 5G Core Network (5GCN) and the second core network is Evolved Packet Core network (EPC).

Example Embodiment 111

The access node of Example Embodiment 109, wherein the access node is connected to 5GCN and EPC.

Example Embodiment 112

A method in an access node of a radio access network comprising:

generating first access control information for a first core network and separately generating second access control information for a second core network;

the first access control information comprising access control parameters configured to be used for evaluation by a wireless terminal in determining whether an access attempt is allowed or barred for the first core network;

the second access control information comprising access control parameters configured to be used for evaluation by a wireless terminal in determining whether the access attempt is allowed or barred for the second core network;

transmitting the first access control information and the second access control information over a radio interface to the wireless terminal.

Example Embodiment 113

The method of Example Embodiment 112, wherein the first core network is 5G Core Network (5GCN) and the second core network is Evolved Packet Core network (EPC).

Example Embodiment 114

The method of Example Embodiment 112, wherein the access node is connected to 5GCN and EPC.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless terminal communicating with an access node, the access node being connected to a first core network and a second core network, the wireless terminal comprising:
   receiver circuitry configured to receive from the access node first access control information and to separately receive from the access node second access control information;
   processor circuitry configured to:
      perform, based on the first access control information, an access control procedure for the first core network, and to perform, based on the second access control information, an access control procedure for the second core network; and
   transmitter circuitry configured to transmit an access request; wherein
      in case that an access attempt is allowed by the access control procedure for the first core network, the transmitter circuitry is configured to transmit, to the access node, an access request for the first core network, and
      in case that the access attempt is barred by the access control procedure for the first core network and an access attempt is allowed by the access control procedure for the second core network, the transmitter circuitry is configured to transmit, to the access node, an access request for the second core network.

2. The wireless terminal of claim 1, wherein the first core network is 5G Core Network (5GCN) and the second core network is Evolved Packet Core network (EPC).

3. A method in a wireless terminal communicating with an access node, the access node being connected to a first core network and a second core network, the method comprising:
   receiving from the access node first access control information and separately receiving from the access node second access control information;
   performing, based on the first access control information, an access control procedure for the first core network,
   performing, based on the second access control information, an access control procedure for the second core network; wherein
   in case that an access attempt is allowed by the access control procedure for the first core network, transmitting, to the access node, an access request for the first core network; and
   in case that the access attempt is barred by the access control procedure for the first core network and the access attempt is allowed by the access control procedure for the second core network, transmitting, to the access node, an access request for the second core network.

4. The method of claim 3, wherein the first core network is 5G Core Network (5GCN) and the second core network is Evolved Packet Core network (EPC).

5. An access node of a radio access network which is connected to a first core network and a second core network, the access node comprising:
   processor circuitry configured to generate a first access control information for the first core network and separately to generate a second access control information for the second core network;
   the first access control information comprising access control parameters configured to be used for evaluation by a wireless terminal in determining whether an access attempt is allowed or barred for the first core network;

the second access control information comprising access control parameters configured to be used for evaluation by the wireless terminal in determining whether an access attempt is allowed or barred for the second core network; and transmitter circuitry configured to transmit the first access control information and the second access control information over a radio interface to the wireless terminal.

6. The access node of claim 5, wherein the first core network is 5G Core Network (5GCN) and the second core network is Evolved Packet Core network (EPC).

7. The access node of claim 5, wherein the access node is connected to 5GCN and EPC.

8. A method in an access node of a radio access network which is connected to a first core network and a second core network, the method comprising:

generating first access control information for the first core network and separately generating second access control information for the second core network;

the first access control information comprising access control parameters configured to be used for evaluation by a wireless terminal in determining whether an access attempt is allowed or barred for the first core network;

the second access control information comprising access control parameters configured to be used for evaluation by the wireless terminal in determining whether an access attempt is allowed or barred for the second core network; and transmitting the first access control information and the second access control information over a radio interface to the wireless terminal.

9. The method of claim 8, wherein the first core network is 5G Core Network (5GCN) and the second core network is Evolved Packet Core network (EPC).

10. The method of claim 8, wherein the access node is connected to 5GCN and EPC.

* * * * *